United States Patent [19]
Okada et al.

[11] Patent Number: 5,786,901
[45] Date of Patent: Jul. 28, 1998

[54] IMAGE SHIFTING MECHANISM AND IMAGING DEVICE

[75] Inventors: Hideo Okada, Nara; Masayuki Nishikawa, Higashi-osaka; Tohru Okuda, Nara, all of Japan

[73] Assignee: Sharp Kabushiki Kaisha, Osaka, Japan

[21] Appl. No.: 824,185

[22] Filed: Mar. 26, 1997

Related U.S. Application Data

[63] Continuation of Ser. No. 654,734, May 29, 1996, abandoned.

[30] Foreign Application Priority Data

| May 30, 1995 | [JP] | Japan | 7-132273 |
| Jan. 22, 1996 | [JP] | Japan | 8-008628 |

[51] Int. Cl.$^6$ ..................... H04N 1/04
[52] U.S. Cl. ............ 358/474; 358/471; 358/482; 348/219; 359/130; 250/208.1
[58] Field of Search ............ 358/474, 487, 358/471, 412, 413, 482, 483, 475, 505, 506, 513; 348/219, 770, 771; 250/208.1; 359/129, 130, 131, 132

[56] References Cited

U.S. PATENT DOCUMENTS

| 4,385,373 | 5/1983 | Howe | 348/219 |
| 4,920,418 | 4/1990 | Robinson | 348/219.322 |
| 5,089,740 | 2/1992 | Ono | 310/328 |
| 5,245,416 | 9/1993 | Glenn | 348/219 |
| 5,253,098 | 10/1993 | Hikita et al. | 359/213 |
| 5,282,043 | 1/1994 | Cochard et al. | 348/219 |
| 5,307,170 | 4/1994 | Itsumi et al. | 348/219 |
| 5,365,296 | 11/1994 | Murakami et al. | 354/195.1 |
| 5,400,070 | 3/1995 | Johnson et al. | 348/219 |
| 5,402,171 | 3/1995 | Tagami et al. | 348/219 |

FOREIGN PATENT DOCUMENTS

| 01128032 | 5/1989 | European Pat. Off. |
| 0653657A1 | 11/1994 | European Pat. Off. |
| 60-54576 | 3/1985 | Japan |
| 63-284980 | 11/1988 | Japan |
| 64-39177 | 2/1989 | Japan |
| 1-35550 | 7/1989 | Japan |
| 1-276114 | 11/1989 | Japan |
| 5-276452 | 10/1993 | Japan |
| 6-214175 | 8/1994 | Japan |

*Primary Examiner*—Edward L. Coles
*Assistant Examiner*—Cheukfan Lee

[57] ABSTRACT

The disclose is intended to miniaturize the actuator of an image shifting mechanism, to operate the actuator at high speed, and to reduce the effect of image shifting on image resolution. In an image shifting mechanism, a pair of bimorph type piezoelectric elements are disposed on both sides of a refraction plate. The bimorph type piezoelectric elements have a cantilever structure. The base end sides of the bimorph type piezoelectric elements are bonded and secured to a stage, and the free end sides are sandwiched between an upper holding plate and a lower holding plate so as to support one end of the refraction plate. When the bimorph type piezoelectric elements are displaced, the refraction plate can be inclined around its rotation center O. In the case of this structure, the specifications of the refraction plate and the bimorph type piezoelectric elements are determined so that the relationship between the moment of inertia $I_c$ around the rotation center of the moving portions of the image shifting mechanism and the moment of inertia $I_g$ around the center of gravity of the image shifting mechanism is $I_c/I_g \leq 1.6$.

13 Claims, 13 Drawing Sheets

DRIVE CIRCUIT 19

IMAGE-PROCESSING CIRCUIT 20

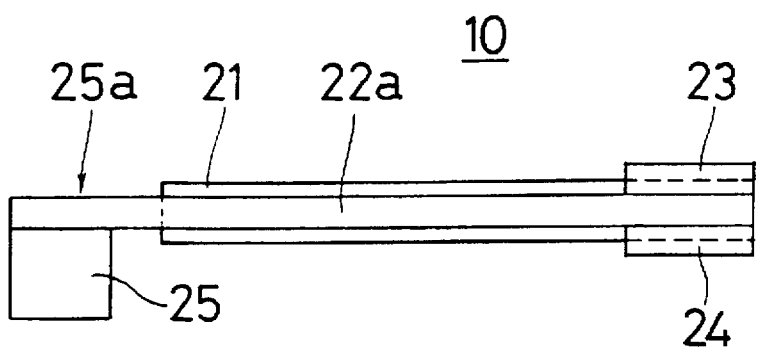
FIG. 5A
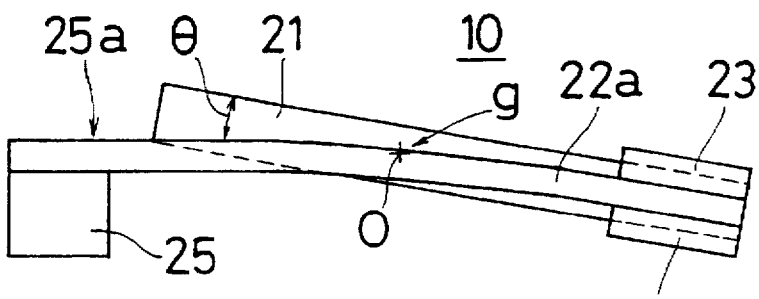
FIG. 5B
FIG. 6
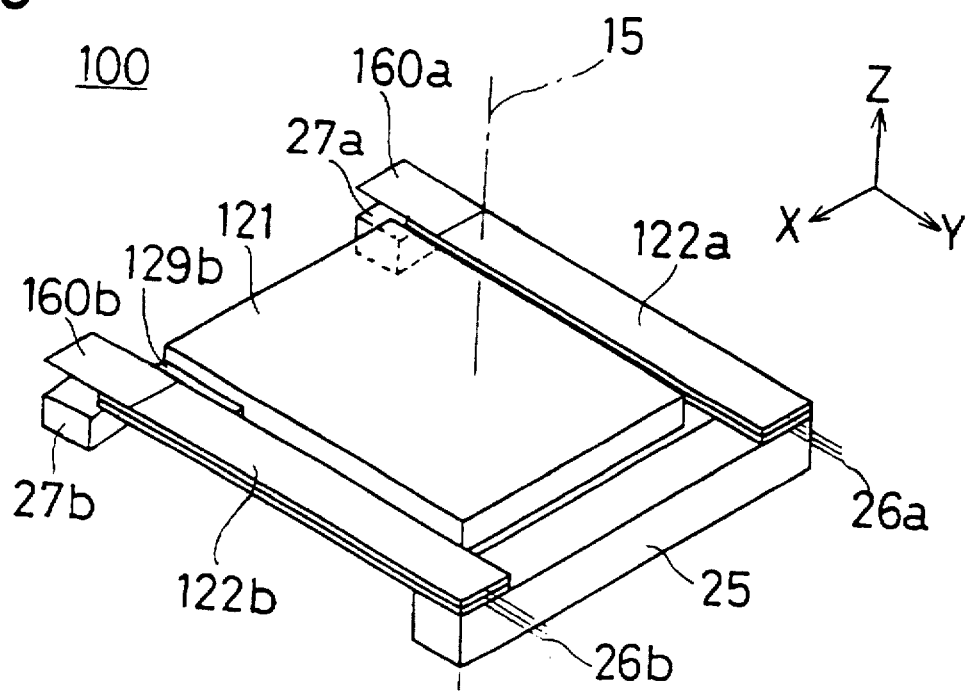

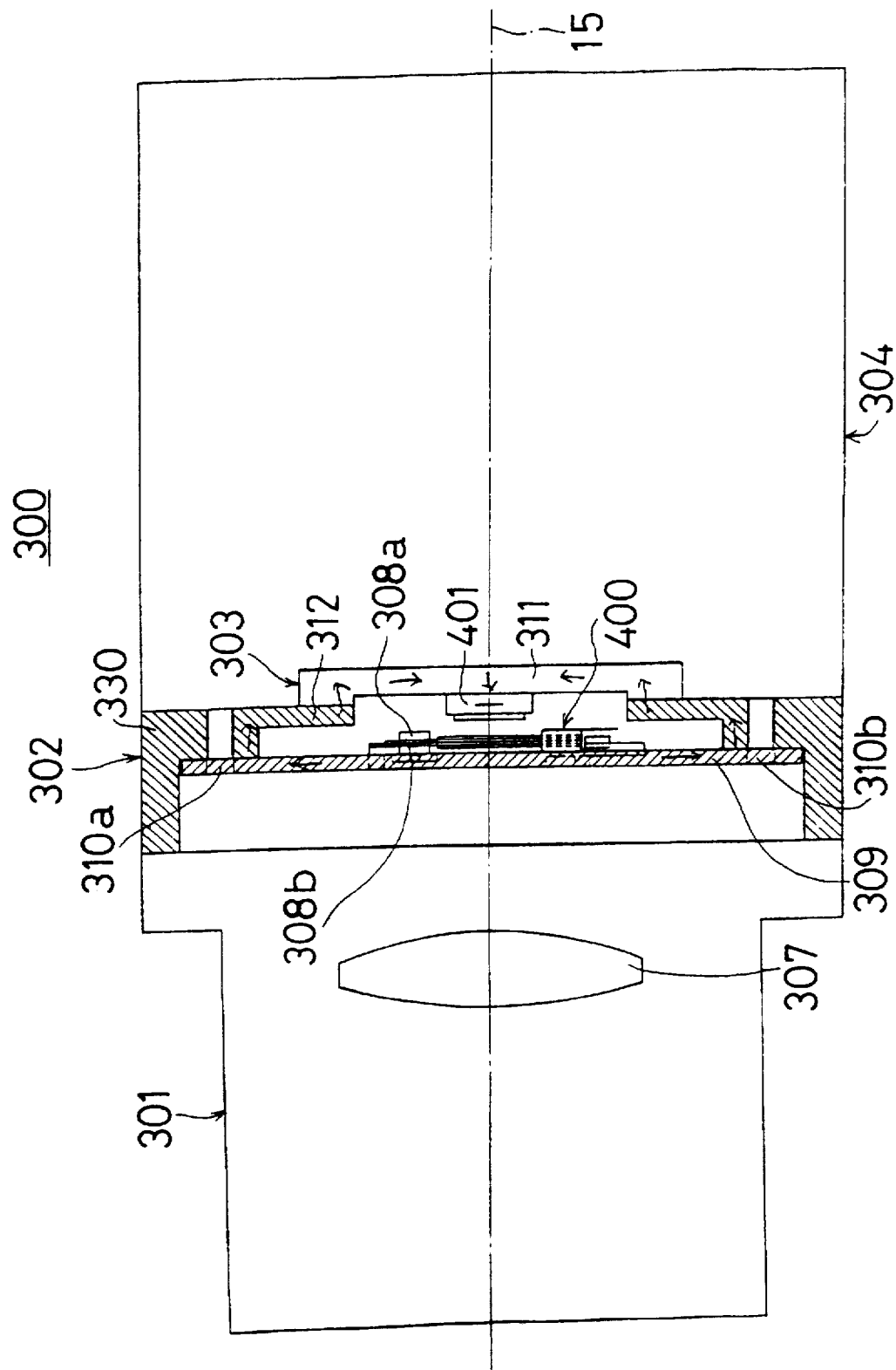

IMAGE SHIFTING MECHANISM AND IMAGING DEVICE

This application is a continuation of application Ser. No. 08/654,734 filed on May 29, 1996, now abandoned.

BACKGROUND OF THE INVENTION

1. Field of the Invention

The present invention relates to improvements in an image shifting mechanism for equivalently increasing a resolution by shifting the light incident from a subject to a solid state imaging device, and in an imaging apparatus including means for driving the image shifting mechanism.

2. Description of the Related Art

Conventionally, an image shifting mechanism as shown in FIG. 16 has been used to equivalently increase the resolution of a solid state imaging device, such as a CCD (charge-coupled device) used for a still camera and a motion video camera. When a flat refraction plate 1 is inclined by θ with respect to the optical axis 2 of incident light 3 as shown by alternate long and two short dashes lines, the incident light 3 having passed through the refraction plate 1 is displaced from the optical axis 2 of the incident light 3 by a shift amount Δ represented by a formula (1) described below:

$$\Delta = t \cdot \sin \theta (1 - 1/n) \tag{1}$$

wherein t represents the thickness of the refraction plate 1 and n represents the refractive index of the material constituting the refraction plate 1. In general, the resolution of the solid state imaging device is almost determined fundamentally by the number of pixels formed on the light-receiving surface of the device. Although a high resolution can be obtained by increasing the number of pixels of the solid state imaging device, increasing the number of pixels is limited to some extent in consideration of technology and cost. When an imaging mechanism shown in FIG. 16 is used, an image having a relatively high resolution can be obtained by using a solid state imaging device having a limited number of pixels. A typical prior art wherein the resolution is increased by image shifting has been disclosed by Japanese Unexamined Patent Publication JP-A 60-54576(1985), for example. In this prior art, the light incident from the subject to the solid state imaging device is displaced little by little by changing the inclination angle of the refraction plate 1, and images obtained are stored in an image memory. By composing a plurality of the images thus obtained, the number of pixels of the solid state imaging device can be increased artificially, and the resolution can be increased equivalently.

FIG. 17 shows the operating principle of an improved system of such a prior art as that has been proposed by Japanese Unexamined Patent Publication JP-A 63-284980 (1988). The light incident from a subject 5 is gathered by a lens 6 and passes through a refraction plate 1. The inclination angle of the refraction plate 1 can be controlled electrically by a piezoelectric element 7. The light having passed through the refraction plate 1 enters the light-receiving surface of a solid state imaging device 8. By setting the inclination direction of the refraction plate 1 to 45 degrees with respect to the arrangement direction of pixels 9 on the light-receiving surface of the solid state imaging device 8, the light incident from the subject 5 to the solid state imaging device 8 can be shifted by a small distance in a direction of 45 degrees with respect to the arrangement direction of the pixels 9 of the solid state imaging device 8. The dead zone of the device is interpolated by image processing, whereby the resolution of the solid state imaging device 8 can be increased artificially in both the horizontal and vertical directions.

Furthermore, a prior art for artificially increasing the resolution of a solid state imaging device has been disclosed by Japanese Unexamined Patent Publication JP-A 5-276452 (1993) and U.S. Pat. No. 4,920,418. Moreover, unlike the image shifting system, a prior art wherein bimorph type piezoelectric elements are used as means for changing the optical path has been disclosed by Japanese Unexamined Patent Publications JP-A 1-276114(1989) and JP-A 6-214175(1994).

However, the above-mentioned prior arts have the following problems. That is to say, although a piezoelectric element is used as an actuator for inclining a refraction plate in JP-A 60-54576, JP-A 63-284980 and JP-A 5-276452, the structures, and design and drive methods of their embodiments are not explained specifically. Only the operating principles for increasing the resolution are explained by these prior arts, but specific actuator configuration methods are not disclosed.

Furthermore, although the structure of such an actuator has been disclosed specifically by JP-A 1-276114, JP-A 6-214175 and U.S. Pat. No. 4,920,418, the actuator is larger than driven members, such as a glass plate, an optical element and a mirror. Therefore, the actuator causes a bottleneck to miniaturization required when the actuator is attempted to be used for a portable VTR apparatus, which is sometimes referred to as a movie, for example. In addition, nothing is explained specifically about the method for increasing the moving speed of the refraction plate in all the above-mentioned prior arts. When an attempt is made to increase the resolution by the image shifting method, in case a time for taking a plurality of images by inclining the refraction plate is long, the resolution after image composition does not increase because of the movement of the operator's hands or the movement of the subject. Accordingly, it is necessary to increase the driving speed of the actuator.

SUMMARY OF THE INVENTION

The present invention is intended to solve the above-mentioned problems. An object of the invention is to provide an image shifting mechanism applicable to portable imaging apparatuses, in which a miniaturized actuator for inclining a refraction plate can be used. Another object of the invention is to provide an imaging apparatus to which a method for increasing the speed of the actuator and a method for enhancing accuracy in consideration of elimination of vibration transmitted to external apparatuses and changes with time are applied.

The present invention provides an image shifting mechanism for shifting the optical axis of incident light to a solid state imaging device by inclining a flat refraction plate and equivalently increasing the resolution of an image, the image shifting mechanism being disposed between an optical system for condensing light from a subject and a solid state imaging device for imaging the subject, wherein a pair of bimorph type piezoelectric elements are
 disposed on both sides of the flat refraction plate so that the surfaces of the elements are nearly parallel to a surface of the flat refraction plate,
one end of the flat refraction plate is joined to the free end sides of the pair of bimorph type piezoelectric elements to be supported such that the other end of the flat refraction plate extends toward the fixed end sides of the pair of bimorph type piezoelectric elements, and the flat refraction plate is angularly displaceable about an imaginary rotation center, that is, an angular displacement center, in the flat refraction plate owing to the displacement of the pair of bimorph type piezoelectric elements.

According to the invention, the flat refraction plate is disposed between the optical system for condensing light from the subject and the solid state imaging device for imaging the subject, and the resolution of the image can be equivalently increased by shifting the optical axis of the incident light to the solid state imaging device. The inclination of the refraction plate can be controlled electrically from outside by displacing the pair of bimorph type piezoelectric elements disposed on both sides of the refraction plate so that the surfaces of the bimorph type piezoelectric elements are nearly parallel with the surface of the refraction plate. One end of the refraction plate is joined to the free end sides of the pair of bimorph type piezoelectric elements to be supported such that the other end of the refraction plate extends toward the fixed end sides of the bimorph type piezoelectric elements. Since the refraction plate is angularly displaceable about the imaginary rotation center in the refraction plate when the bimorph type piezoelectric elements are displaced, the whole structure including the refraction plate to be inclined and the bimorph type piezoelectric elements can be made smaller, and can be mounted in a portable movie unit or the like.

Furthermore, the invention is characterized in that specifications of the refraction plate and the bimorph type elements are determined so that the rotation center used as the inclination center of the refraction plate passes through the center of gravity of the image shifting mechanism.

According to the invention, since the center of gravity of an actuator formed by the pair of bimorph type piezoelectric elements is aligned with the imaginary rotation center used as the inclination center of the refraction plate, thrust force required for driving and displacing the refraction plate can be minimized, and the refraction plate can be driven at high speed with advantage. Since the rotation center of the refraction plate is aligned with the center of gravity of the moving portions, external vibration can be prevented during image shifting.

Furthermore, the invention is characterized in that specifications of the refraction plate and the bimorph type piezoelectric elements are determined so that a formula of $$Ic/Ig \leqq 1.6 \tag{2}$$

can be established between the moment of inertia Ic around the rotation center used as the inclination center of the refraction plate and the moment of inertia Ig around the center of gravity of the moving portions of the image shifting mechanism.

According to the invention, the specifications of the refraction plate and the bimorph type piezoelectric elements are determined on the basis of the formula (2). Therefore, the effect on image resolution due to vibration caused by dislocation between the rotation center of the refraction plate and the center of gravity of the moving portions during image shifting can be decreased. In addition, the specifications to be determined for the refraction plate and the bimorph type piezoelectric elements can have wider ranges and can be attained easily.

Furthermore, the present invention is characterized in that the free ends of the pair of bimorph type piezoelectric elements and the one end of the refraction plate are sandwiched between a pair of holding plates from the sides of the top and bottom surfaces of the refraction plate.

According to the invention, both surfaces of the refraction plate are sandwiched between the pair of holding plates at the free ends of the pair of bimorph type piezoelectric elements so as to hold one end of the refraction plate. With this structure, the moving portions of the image shifting mechanism can be made compact.

Furthermore, the invention is characterized in that the pair of bimorph type piezoelectric elements is formed at a pair of parallel portions of a nearly U-shaped intermediate electrode, respectively, and the refraction plate is joined to the connection portion of the intermediate electrode, connecting the pair of parallel portions of the intermediate electrode.

According to the invention, the pair of bimorph type piezoelectric elements are formed at the pair of parallel portions of the nearly U-shaped intermediate electrode, respectively, the connection portion for connecting the pair of parallel portions of the nearly U-shaped intermediate electrode is formed on the free end side, and the refraction plate is joined to the connection portion by using an adhesive or the like. Consequently, the moving portions of the image shifting mechanism can be made light in weight. In addition, the production process of the mechanism can be shortened and the production cost can be reduced.

Furthermore, the present invention discloses an imaging apparatus comprising:

an image shifting mechanism for shifting the optical axis of incident light to a solid state imaging device by inclining a flat refraction plate and equivalently increasing the resolution of an image, the image shifting mechanism being disposed between an optical system for condensing light from a subject and a solid state imaging device for imaging the subject, wherein:

a pair of bimorph type piezoelectric elements is disposed on both sides of the flat refraction plate so that the surfaces of the elements are nearly parallel to a surface of the flat refraction plate, one end of the flat refraction plate is joined to the free end sides of the pair of bimorph type piezoelectric elements to be supported such that the other end of the flat refraction plate extends toward the fixed end sides of the pair of bimorph type piezoelectric elements, and the flat refraction plate is angularly displaceable about an imaginary rotation center in the flat refraction plate owing to the displacement of the pair of bimorph type piezoelectric elements, the imaging apparatus further comprising:

drive means for driving the pair of bimorph type piezoelectric elements, detection means for detecting the inclination angle of the refraction plate, comparison means for comparing an output of the detection means with a predetermined target value and for outputting the quantitative error between the output and the target value, and control means for controlling an output of the drive means in response to the output of the comparison means, wherein the pair of bimorph type piezoelectric elements are driven so that the inclination angle of the refraction plate coincides with the predetermined target value.

According to the invention, in the refraction plate, both sides of which are provided with the pair of bimorph is joined to the free end sides of the pair of bimorph type piezoelectric elements to be supported such that the other end of the flat refraction plate extends toward the fixed end sides of the pair of bimorph type piezoelectric elements. By the displacement of the pair of bimorph type piezoelectric elements, the refraction plate can be inclined about the imaginary inclination center in the inside of the refraction plate. By inclining the refraction plate at a predetermined angle, the optical axis of the light incident from the optical system gathering light from the subject to the solid state imaging device for imaging the subject can be shifted, and image shifting for equivalently increasing the resolution can be attained.

To set the inclination angle of the refraction plate to a predetermined angle, the detection means detects the inclination angle of the refraction plate, and the comparison means compares the predetermined value with the inclination angle detected by the detection means and outputs the quantitative error. Based on the quantitative error, the control means controls the output of the drive means to drive the pair of bimorph type piezoelectric elements. Therefore, by inclining the refraction plate to the predetermined angle, the optical axis of the light incident from the optical system gathering light from the subject to the solid state imaging device for imaging the subject can be shifted, and image shifting for equivalently increasing the resolution can be attained.

Furthermore, the present invention discloses an imaging apparatus comprising:

an image shifting mechanism for shifting the optical axis of incident light to a solid state imaging device by inclining a flat refraction plate and equivalently increasing the resolution of an image, the image shifting mechanism being disposed between an optical system for condensing light from a subject and a solid state imaging device for imaging the subject, wherein:

a pair of bimorph type piezoelectric elements is disposed on both sides of the flat refraction plate so that the surfaces of the elements are nearly parallel to a surface of the flat refraction plate, one end of the flat refraction plate is joined to the free end sides of the pair of bimorph type piezoelectric elements to be supported such that the other end of the flat refraction plate extends toward the fixed end sides of the pair of bimorph type piezoelectric elements, and the flat refraction plate is angularly displaceable about an imaginary rotation center in the flat refraction plate owing to the displacement of the pair of bimorph type piezoelectric elements, the imaging apparatus further comprising:

a pair of drive means for driving the pair of bimorph type piezoelectric elements respectively, and gain adjustment means added to at least one of the pair of drive means, wherein an inclination direction of the refraction plate can be adjusted by controlling the gain adjustment means and correcting the individual differences of the bimorph type piezoelectric elements.

According to the invention, in the refraction plate, both sides of which are provided with the pair of bimorph type piezoelectric elements, one end of the flat refraction plate is joined to the free end sides of the pair of bimorph type piezoelectric elements to be supported such that the other end of the flat refraction plate extends toward the fixed end sides of the pair of bimorph type piezoelectric elements. By the displacement of the pair of bimorph type piezoelectric elements, the refraction plate can be angularly displaced about the imaginary inclination center in the inside of the refraction plate. By inclining the refraction plate, the optical axis of the light incident from the optical system gathering light from the subject to the solid state imaging device for imaging the subject can be shifted, and image shifting for equivalently increasing the resolution can be attained. By adding the gain adjustment means to at least one of the pair of drive means, the displacement of the inclination direction of the refraction plate due to the individual differences and differences in property of the bimorph type piezoelectric elements can be corrected. Therefore, the accuracy of the image shifting mechanism can be enhanced and stabilized.

Furthermore, the imaging apparatus of the invention further comprises:

detection means for detecting the inclination angle of the refraction plate, comparison means for comparing an output of the detection means with a predetermined target value and for outputting the quantitative error between the output and the target value, and control means for controlling the pair of the drive means in response to the output of the comparison means, wherein the pair of bimorph type piezoelectric elements are driven so that the inclination angle of the refraction plate coincides with the predetermined target value.

According to the invention, to set the inclination angle of the refraction plate to a predetermined target value, the detection means detects the inclination angle of the refraction plate, and the comparison means compares the predetermined target value with the inclination angle detected by the detection means and outputs the quantitative error. Based on the quantitative error, the control means controls the pair of drive means to drive the pair of bimorph type piezoelectric elements. Consequently, the inclination angle of the refraction plate can be set to the predetermined target value.

Furthermore, the invention is characterized in that the detection means detects the inclination angle of the refraction plate by detecting the displacement amounts of the pair of bimorph type piezoelectric elements.

According to the invention, the inclination angle of the refraction plate is detected by detecting the displacement amounts of the bimorph type piezoelectric elements, instead of directly detecting the inclination angle of the refraction plate. Therefore, since it is not necessary to dispose the detection means in the inclination direction of the refraction plate, the structure can be made compact.

Furthermore, the invention is characterized in that an image processing circuit is provided, which compares image data obtained at the inclination angle of the refraction plate before image shifting with image data obtained at the inclination angle of the refraction plate after image shifting, computes the movement vector of the image having been moved during image shifting, and corrects the inclination angle of the refraction plate on the basis of the computed results.

According to the invention, since the inclination angle of the refraction plate can be corrected by the movement vector of the image obtained from image data before and after image shifting, the accuracy of the image shifting mechanism can be improved and effects of changes with time on the image shifting mechanism can be avoided.

Furthermore, the invention is characterized in that correction means including a temperature detection element, for correcting an output value of the detection means in response to detection results of the temperature detection element.

According to the invention, the detection means is constituted of, for example, a photo interrupter. When temperature change occurs in the imaging apparatus provided with the detection means because of changes in environmental conditions or the like, the output value of the detection means is changed depending on the temperature characteristic of the detection means itself, and proper output values may not be obtained. The correction means prevents the change in the output value of the detection means in accordance with the temperature change detected by the temperature detection element so as to obtain proper output values. Therefore, even when temperature change occurs, the detection means can output proper output values, whereby a highly reliable imaging apparatus can be attained.

Furthermore, the invention is characterized in that the temperature detection element is second detection means having the same detection characteristic of the detection means, and is disposed at a position not affected by the displacements of the moving portions of the image shifting mechanism.

According to the invention, the temperature detection element is the second detection means having the same detection characteristic of the first detection means, and the detection results are not affected by the displacements of the moving portions of the image shifting mechanism. Therefore, the second detection means can accurately detect the change in the output value of the detection means due to the change in temperature in the imaging apparatus, whereby the correction means can easily correct the output value of the detection means.

According to the invention, since the pair of bimorph type piezoelectric elements are disposed on both sides of the refraction plate to be inclined, and one end of the refraction plate is joined to the free ends of the bimorph type piezoelectric elements so as to be extended from the free end side to the fixed end side of the bimorph type piezoelectric elements as described above, the image shifting mechanism can be made compact and driven at high speed, whereby the mechanism can be installed easily in a portable movie unit or the like to enhance image resolution.

Furthermore, according to the invention, by aligning the center of gravity of the actuator comprising the pair of bimorph type piezoelectric elements with the imaginary rotation center of the inclination of the refraction plate, the thrust force for driving can be minimized, and the high-speed drive of the refraction plate can be attained with advantage. When the high-speed drive of the refraction plate is attained, a plurality of images can be taken in a short period of time, whereby image resolution can be less affected by the movement of the operator's hands or the like. In addition, since the center of gravity of the moving portions of the image shifting mechanism is slightly moved, the vibration to external apparatuses due to the high-speed drive can be reduced, whereby the resolution can be prevented from being deteriorated.

Furthermore, according to the invention, since the specifications of the refraction plate and the bimorph type piezoelectric elements are determined on the basis of the formula (2), vibration to external apparatuses due to the dislocation between the rotation center and the center of gravity of the moving portions during image shifting hardly affects the resolution. Moreover, the specifications of the refraction plate and the bimorph type piezoelectric element can have wider ranges, whereby the refraction plate and the bimorph type piezoelectric elements can be attained easily.

Furthermore, according to the invention, the moving portions of the image shifting mechanism can be made compact.

Furthermore, according to the invention, the nearly U-shaped intermediate electrode is commonly used for the pair of bimorph type piezoelectric elements, the central portion of the intermediate electrode is disposed at the free ends of the bimorph type piezoelectric elements, and the refraction plate is joined to the central portion of the intermediate electrode by using adhesion or the like. Therefore, the moving portions of the image shifting mechanism can be made compact. In addition, the production process of the mechanism can be abbreviated and the production cost can also be reduced.

Furthermore, according to the invention, since the optical axis of the light incident from the optical system for gathering the light from the subject to the solid state imaging device for imaging the subject can be shifted by inclining the refraction plate to a predetermined angle, image shifting for equivalently enhancing resolution can be attained.

Furthermore, according to the invention, since displacement of the refraction plate in a inclination direction of the refraction plate caused due to the individual differences in the properties and characteristics of the pair of bimorph type piezoelectric elements caused during the operation of the image shifting mechanism can be corrected, the accuracy of the image shifting mechanism can be enhanced and stabilized.

Furthermore, according to the invention, the detection means detects the inclination angle of the refraction plate by detecting the displacement amounts of the bimorph type piezoelectric elements. Therefore, it is not necessary to dispose the detection means in the inclination direction of the refraction plate, whereby the structure can be made compact.

Furthermore, according to the invention, since the inclination of the refraction plate can be corrected on the basis of the movement vector obtained from image data before and after image shifting, the operation accuracy of the image shifting mechanism can be enhanced and not affected by any change with time or the like.

Furthermore, according to the invention, the correction means performs correction to obtain proper output values, while preventing the change in the output value of the detection means in response to temperature change detected by the temperature detection element. Therefore, an image shifting mechanism having high stability can be obtained even when temperature change occurs.

Furthermore, according to the invention, since the temperature detection element has the same detection characteristics as those of the detection means, the detection results of the element are not affected by the displacements of the moving portions of the image shifting mechanism. Therefore, since only the change in the output of the detection means due to the change in temperature in the imaging apparatus can be detected accurately, the output value of the detection means can be corrected easily.

BRIEF DESCRIPTION OF THE DRAWINGS

Other and further objects, features, and advantages of the invention will be more explicit from the following detailed description taken with reference to the drawings wherein:

FIG. 5A is a simplified side view of the image shifting mechanism 10 of FIG. 2 in a state of before operation;

FIG. 5B is a simplified side view of the image shifting mechanism 10 of FIG. 2 in a state of after operation;

FIG. 6 is a perspective view of an image shifting mechanism 100 of another embodiment of the invention;

FIG. 9 is a sectional view showing the structure of an experimental model 300 including an image shifting mechanism 400 of which measurement results are as shown in FIG. 8;

DETAILED DESCRIPTION OF THE PREFERRED EMBODIMENTS

Figure 1:
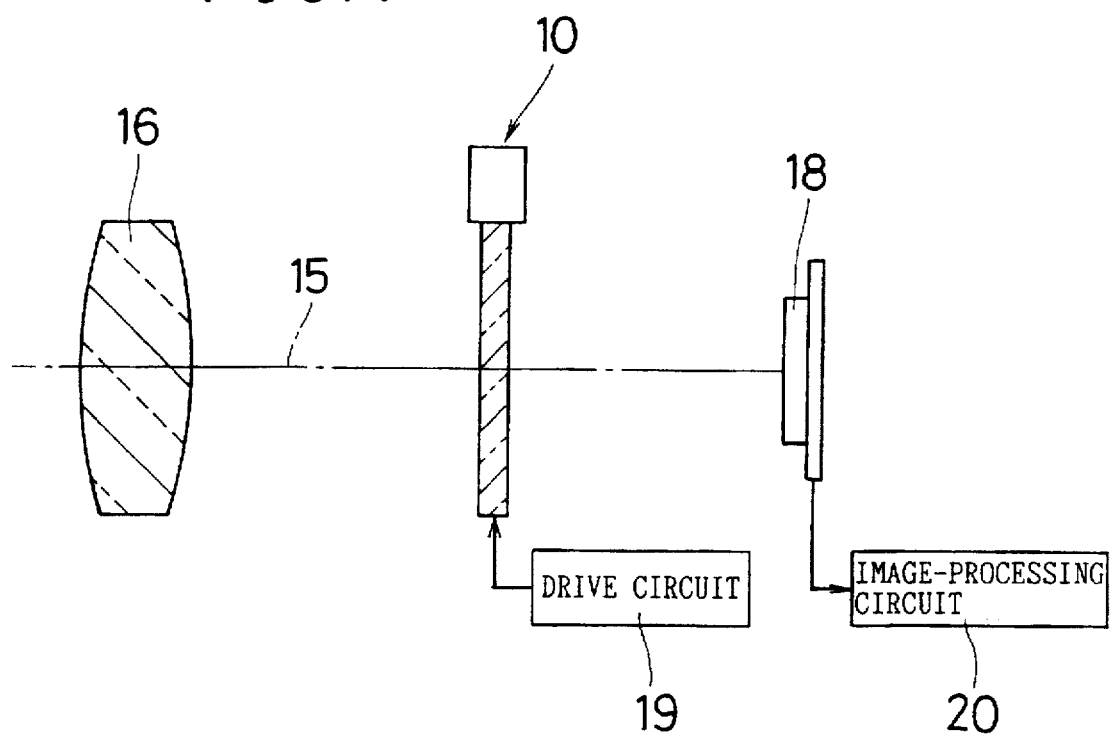
FIG. 1 is a schematic optical system diagram of an imaging apparatus including an image shifting mechanism of an embodiment of the invention.

Now referring to the drawings, preferred embodiments of the invention are described below.

FIG. 1 shows a schematic structure of an embodiment of the invention. An image shifting mechanism 10 is disposed on the extension of the optical axis 15 of the light from a subject (not shown), and provided to displace the position of the optical axis 15 along which the light having passed through a lens 16 enters the light-receiving surface of a solid state imaging device 18, such as a CCD. The image shifting mechanism 10 is driven electrically so that the optical axis 15 is shifted by a predetermined angle by a drive circuit 19 in accordance with commands from an external control portion. A plurality of pixels are arranged in two dimensions on the light-receiving surface of the solid state imaging device 18. An image having an equivalently high resolution can be obtained by using an image-processing circuit 20 to compose a plurality of images taken by shifting the incident light in succession by a minute distance smaller than the pitch of the arrangement. The above-mentioned control portion can also be provided in the image-processing circuit 20. Since the operating principle itself of the image shifting mechanism 10 is similar to that of the above-mentioned prior art, the operating principle is not detailed here. In addition, since the method for composing images is also similar to that for the prior art, the explanation of the method is omitted.

Figure 2:
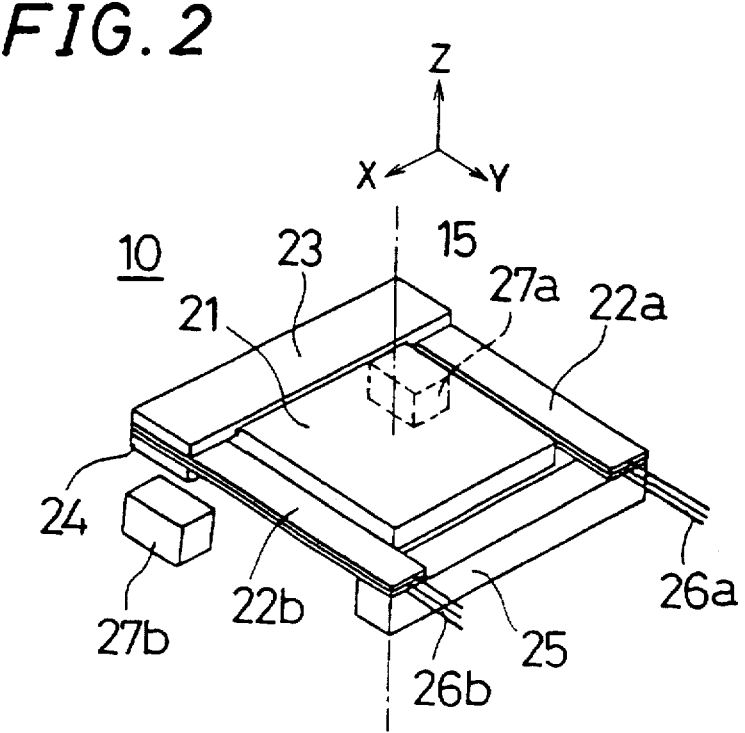
FIG. 2 is a perspective view showing the image shifting mechanism 10 of the embodiment of FIG. 1.
Figure 3:
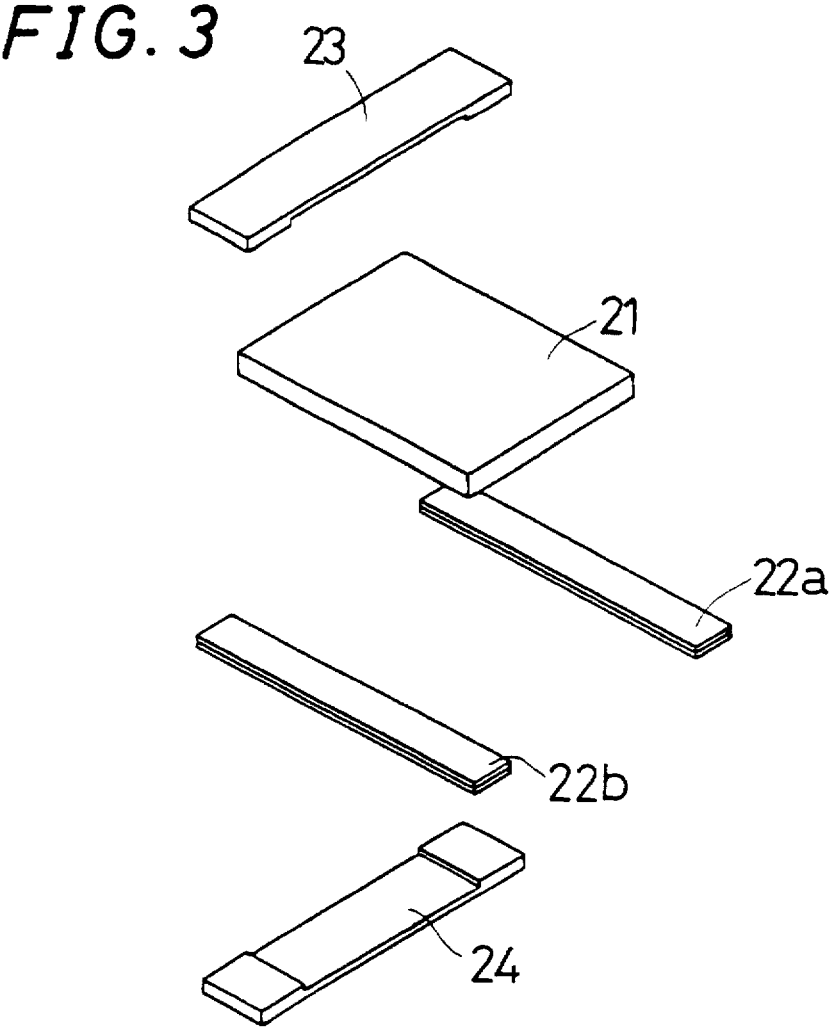
FIG. 3 is an exploded perspective view of the image shifting mechanism 10 of FIG. 2.

FIGS. 2 and 3 shows the detailed structure of the image shifting mechanism 10 shown in FIG. 1. FIG. 2 is a perspective view showing the actuator portion of the image shifting mechanism 10. FIG. 3 is an exploded perspective view showing the actuator portion. In these figures, a refraction plate 21 is a rectangular plate and provided with a pair of bimorph type piezoelectric elements 22a and 22b disposed on both sides of the refraction plate 21 in the longitudinal direction of the plate. Each of the bimorph type piezoelectric elements 22a and 22b has a cantilever structure, and both the free ends of the bimorph type piezoelectric elements 22a and 22b are sandwiched between an upper holding plate 23 and a lower holding plate 24. The fixed end of each of the bimorph type piezoelectric elements 22a and 22b is joined to a stage 25. The refraction plate 21 is made of a transparent material, such as glass. The refraction plate 21 should preferably be made lighter in weight to decrease inertia. Lead wires 26a and 26b are extended from the fixed ends of the bimorph type piezoelectric elements 22a and 22b respectively. By applying a voltage to the lead wires, the bimorph type piezoelectric elements 22a and 22b can be displaced in parallel with the optical axis 15, that is, in the z direction.

The upper and lower holding plates 23 and 24 are made of a lightweight material, such as plastics, and has an approximate shape of strip. Thick-walled portions are formed at both ends of each of the plates in the longitudinal direction. The plate is nearly U-shaped when viewed from the side of the plate. The thick-walled portions of the upper holding plate 23 and the lower holding plate 24 are placed opposite to each other so as to form a sandwich junction structure, whereby the thick-walled portions sandwich the pair of bimorph type piezoelectric elements 22a and 22b and the intermediate portions sandwich the refraction plate 21. Consequently, the image shifting mechanism 10 can be made compact. The longitudinal direction of the upper holding plate 23 and the lower holding plate 24 is taken as the x direction, and the longitudinal direction of the pair of bimorph type piezoelectric elements 22a and 22b is taken as the y direction. A film-like epoxy resin adhesive, for example, can be used for mutual bonding.

Roughly speaking, as shown in FIG. 2, the refraction plate 21, the bimorph type piezoelectric elements 22a and 22b and the upper and lower holding plates 23, 24 are symmetrical in the up-and-down direction. The bimorph type piezoelectric elements 22a and 22b operate as cantilevers as described above, and one ends of the bimorph type piezoelectric elements, which are free ends, are joined to the upper and lower holding plates 23, 24. The free ends of the bimorph type piezoelectric elements 22a and 22b are free to displace and the movements of the free ends are not restricted by other members. The other ends, that is, the base ends, of the bimorph type piezoelectric elements 22a and 22b are bonded and secured to the stage 25. Alternatively, the stage 25 and a member having a shape nearly similar to that of the stage 25 may be used to sandwich and secure the bimorph type piezoelectric elements 22a and 22b with screws or the like. The stage 25 supports the bimorph type piezoelectric elements 22a and 22b, and is secured to the predetermined position of the housing of an imaging apparatus (not shown). The optical system is arranged in the housing so that all light beams from the subject pass through the refraction plate 21. In addition, position sensors 27a and 27b used as means for detecting the positions of the bimorph type piezoelectric elements 22a and 22b in the optical direction are disposed to obtain the inclination angle of the refraction plate 21. The position sensors 27a and 27b are implemented by using reflection-type photo interrupters, for example, and directly detect the displacement of the lower holding plate 24 so as to detect the displacements of the bimorph type piezoelectric elements 22a and 22b. The bottom surface of the lower holding plate 24 is mirror-finished so as to properly reflect the light from the position sensors, 27a and 27b, such as photo interrupters, although this mirror finish is not shown.

Figure 4:
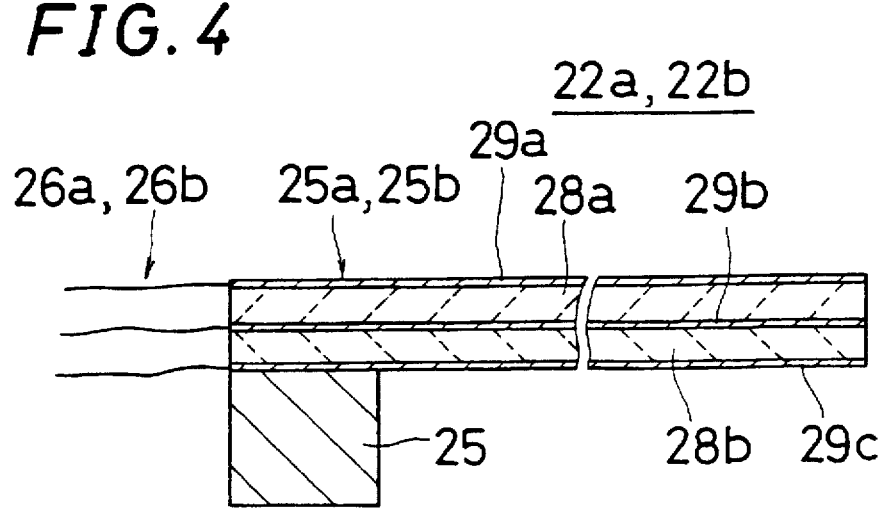
FIG. 4 is a side sectional view of bimorph type piezoelectric elements 22a and 22b shown in FIG. 2.

FIG. 4 shows a sectional structure of the bimorph type piezoelectric elements 22a and 22b shown in FIGS. 2 and 3. As described above, the bimorph type-piezoelectric elements 22a and 22b are used as a cantilever structure; one end is free, and the other end is directly secured to the stage 25 and used as a base end. Two-layer piezoelectric ceramics 28a and 28b are made of PZT, for example. Electrodes 29a, 29b and 29c are formed on the top surface, intermediate surface and bottom surface of the two-layer piezoelectric ceramics 28a and 28b respectively. Lead wires 26a and 26b are extended from the electrodes 29a and 29c on the top and bottom surfaces and from the common electrode 29b on the intermediate surface. By applying a voltage, the bimorph type piezoelectric elements 22a and 22b can be displaced in the z direction. The bimorph type piezoelectric elements 22a and 22b formed in this way are apt to develop individual differences in properties and characteristics depending on the strength and thickness values of the junction surfaces.

The operation of the image shifting mechanism 10 shown in FIG. 1, wherein the bimorph type piezoelectric elements 22a and 22b shown in FIG. 4 are used as actuators, is explained below referring to FIGS. 5A and 5B. FIG. 5A shows a stationary condition of the bimorph type piezoelectric elements 22a and 22b, and FIG. 5B shows a displaced condition of the bimorph type piezoelectric elements 22a and 22b when a predetermined voltage is applied thereto. The bimorph type piezoelectric elements 22a and 22b are used as fulcrums and bent continuously from the base portions 25a and 25b secured to the stage 25 to the free ends so as to take a displaced form. The refraction plate 21, one end of which is joined to the free ends of the bimorph type piezoelectric elements 22a and 22b via the upper and lower holding plates 23, 24, is inclined at an angle of θ. By changing the voltage applied to the bimorph type piezoelectric element 22a and 22b, the refraction plate 21 is inclined around the center O, an imaginary center, passing through the refraction plate 21. The image shifting mechanism 10 having this kind of structure is just one-size larger than the refraction plate 21 as a whole as shown in FIG. 2, while the characteristics, such as the desired inclination and high-speed drive, are retained. Consequently, the entire size of the mechanism 10 can be made compact.

Since the refraction plate 21, the bimorph type piezoelectric elements 22a and 22b, and the upper and lower holding plates 23, 24 are nearly symmetrical in the up-and-down direction as described above, the center of gravity g of these moving portions can be aligned with the rotation center O of the refraction plate 21 as shown in FIG. 5. With this structure, the rotation inertia, namely the moment of inertia, around the rotation center O of the refraction plate 21 of the image shifting mechanism 10 can be minimized, and the thrust force required to incline the refraction plate 21, namely the forces generated by the bimorph type piezoelectric elements 22a and 22b can also be minimized; this is significantly advantageous to attain high-speed operation. Furthermore, since the center of gravity g and the rotation center O of the moving portions are aligned with each other, and the center of gravity is not moved when the refraction plate 21 is driven, vibration to an imaging apparatus (not shown) can be prevented. The method for aligning the rotation center O of the refraction plate 21 with the center of gravity g of the movement portions of the image shifting mechanism 10 is described below. The image shifting mechanism 10 is modeled by using various tools provided for CAE (computer-aided engineering), the obtained data is input, the piezoelectric constants of the bimorph type piezoelectric elements 22a and 22b are given as physical constants, and the deformation characteristic of the refraction plate 21 is simulated, whereby the rotation center O of the refraction plate 21 can be obtained. In order to align the rotation center O with the center of gravity g of the image shifting mechanism 10, the specifications, such as thickness, length and width values, of the major components of the moving portions, namely the refraction plates 21 and the bimorph type piezoelectric elements 22a and 22b, should be selectively determined so as to optimize the shapes of the components.

Figure 7:
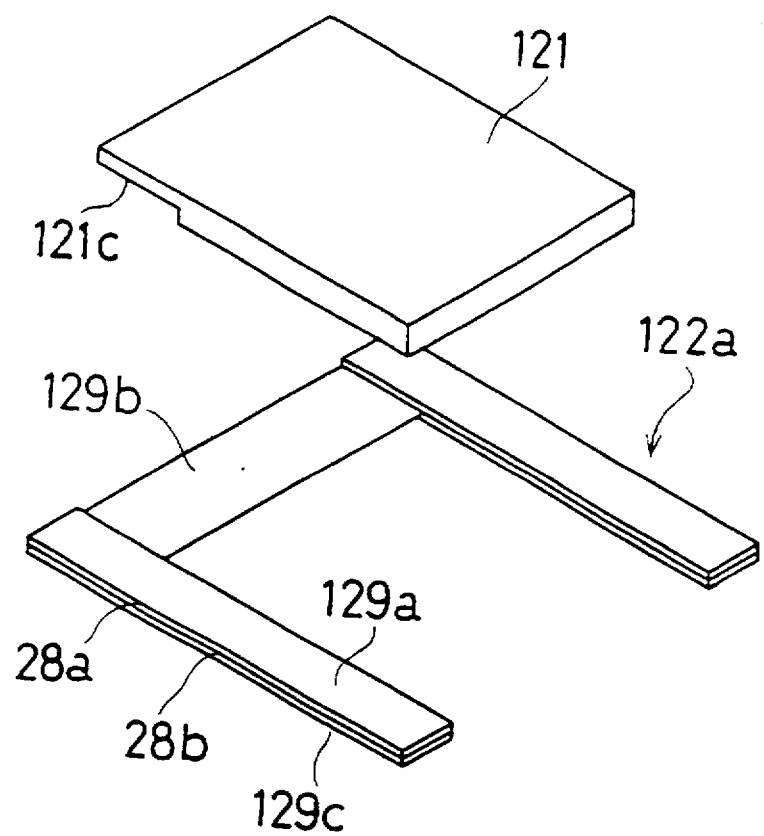
FIG. 7 is an exploded perspective view of the image shifting mechanism 100 of FIG. 6.

FIG. 6 is a perspective view showing an image shifting mechanism 100 of another embodiment. FIG. 7 is an exploded perspective view showing the image shifting mechanism 100 shown in FIG. 6. The components having the same structures as those shown in FIGS. 2 and 3 are designated by the same reference codes and not explained here. A refraction plate 121 is made of a transparent material such as glass and has a shape of rectangle. The refraction plate 121 is provided with a pair of bimorph type piezoelectric elements 122a and 122b disposed on both sides of the refraction plate 121 in the longitudinal direction of the plate. Each of the bimorph type piezoelectric elements 122a and 122b has a cantilever structure. At the free ends of the bimorph type piezoelectric elements 122a and 122b, the central portion of a nearly U-shaped intermediate electrode 129b and commonly used for both the pair of bimorph type piezoelectric elements 122a and 122b are positioned. In contrast, the fixed ends are joined to a stage 25 by using an adhesive or the like. Alternatively, the stage 25 and a member having a shape nearly similar to that of the stage 25 may be used to sandwich and secure the bimorph type piezoelectric elements 122a and 122b with screws or the like. With this structure, the pair of bimorph type piezoelectric elements 122a and 122b are parallel with each other in the longitudinal direction. Lead wires 26a and 26b are extended from the fixed ends of the bimorph type piezoelectric elements 122a and 122b respectively. By applying a voltage to the lead wires, the bimorph type piezoelectric elements 122a and 122b are displaced in the z direction, namely in the direction parallel with the optical axis 15.

The nearly U-shaped intermediate electrode 129b is used as an intermediate electrode for the pair of bimorph type piezoelectric elements 122a and 122b and supplied with a common potential. Piezoelectric ceramics 28a and 28b having a shape of flat plate are provided above and below the pair of parallel portions of the nearly U-shaped intermediate electrode 129b, respectively. Furthermore, the electrodes 129a and 129c are provided above and below the piezoelectric ceramics 28a and 28b respectively so as to form the pair of bimorph type piezoelectric elements 122a and 122b. In addition, a thin-walled portion 121c is formed at one end of the refraction plate 121 in the longitudinal direction thereof and joined to the connection portion for bonding the central portion of the intermediate electrode 129b, namely the pair of parallel portions of the intermediate electrode 129b, by using an adhesive or the like.

Rectangular reflection plates 160a and 160b having a uniform light reflection intensity are provided at the free ends of the pair of bimorph type piezoelectric elements 122a and 122b respectively. One ends of the reflection plates 160a and 160b in the longitudinal direction thereof are joined to the top surfaces of the bimorph type piezoelectric elements 122a and 122b respectively by using an adhesive or the like. The bottom surfaces at the other ends of the reflection plates 160a and 160b in the longitudinal direction thereof are reflection surfaces and mirrorfinished. Furthermore, position sensors 27a and 27b are disposed in the housing of an imaging apparatus (not shown) under the reflection plates 160a and 160b. The position sensors 27a and 27b are means for detecting the positions of the bimorph type piezoelectric elements 122a and 122b in the direction of the optical axis 15, and detect the displacements of the bimorph type piezoelectric elements 122a and 122b by detecting the displacements of the reflection plates 160a and 160b.

Detection errors can be reduced by using the reflection plates 10a and 160b than by using the surfaces of the bimorph type piezoelectric elements 122a and 122b as reflection plates, because of the following reasons. Since the surfaces of the bimorph type piezoelectric elements 122a and 122b are rough, the reflection characteristic becomes ununiform owing to the dispersion of the light incident on the surfaces. As a result, the amount of light detected by the position sensors 27a and 27b is changed regardless of the positions of the bimorph type piezoelectric elements 122a and 122b. In contrast, since the reflection surfaces of the reflection plates 160a and 160b are mirror-finished, the reflection characteristics are uniform, and the amounts of light detected by the position sensors 27a and 27b are changed depending on only the displacements of the bimorph type piezoelectric elements.

Moreover, with the above-mentioned structure, the position sensors 27a and 27b are not required to be disposed under the reflection plate 121 and the bimorph type piezoelectric elements 122a and 122b, whereby the image shifting mechanism 100 can be made smaller in the z direction, namely in the direction parallel with the optical axis 15.

As described above referring to FIGS. 5A and 5B, when the center of gravity g of the actuator is aligned with the rotation center O of the refraction plate, the rotation inertia around the rotation center O of the refraction plate 21, namely the moment of inertia, is minimized. Therefore, the thrust force for inclining the refraction plate 21 can also be minimized, and the refraction plate 21 can be driven properly at high speed. Besides, since the center of gravity of the refraction plate 21 is not moved when driven, vibration to the imaging apparatus can be prevented.

On the other hand, in case the rotation center O is misaligned with the center of gravity g, the values of the moment of inertia around these center positions differ from each other, and the refraction plate 21 cannot be driven properly at high speed. Furthermore, since the center of gravity is moved when the refraction plate 21 is driven, vibration to the imaging apparatus occurs and the optical axis is swayed, thereby deteriorating resolution. Therefore, it is ideal to align the center of gravity g of the actuator with the rotation center O of the refraction plate 21 in the image shifting mechanism 10. However, it is sometimes difficult to obtain the above-mentioned structure even when the specifications, such as the thickness, length and width values of the major components of the actuator, namely the refraction plate 21 and the bimorph type piezoelectric elements 22a and 22b, are selected properly.

Figure 8:
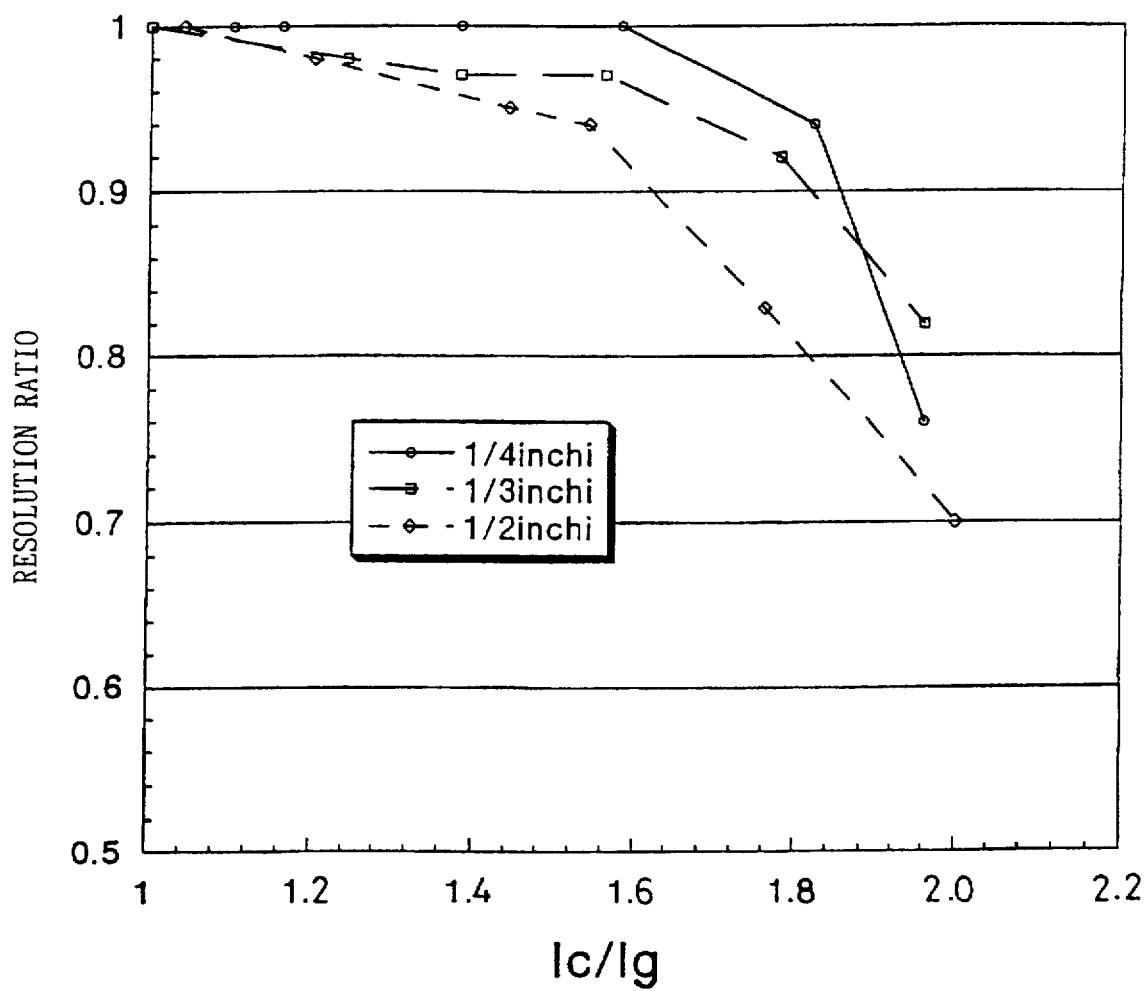
FIG. 8 is a graph showing results of measurement conducted for determining effects on resolution when the center of gravity g of an actuator used as a moving portion of the image shifting mechanism is dislocated from the rotation center O of a refraction plate.

FIG. 8 is a graph showing the results of measurements regarding effects on resolution when the center of gravity g of the actuator used as the moving portion of the image shifting mechanism is misaligned with and the rotation center O of the refraction plate. The abscissa of the graph represents ratio Ic/Ig, where Ic is the moment of inertia around the rotation center O and Ig is the moment of inertia around the axis passing through the center of gravity g. The ordinate represents a resolution ratio. The resolution ratio is a normalized value of resolution measured at a given value of Ic/Ig, assuming that the resolution is 1 when the rotation center O is aligned with the center of gravity g. For the measurement, an image shifting mechanism was made, wherein the size of the refraction plate was changed depending on the type of commercially available optical solid state imaging device: a ½ inch optical solid state imaging device, a ⅓ inch optical solid state imaging device or a ¼ optical solid state imaging device, and an experimental model incorporating the image shifting mechanism were made actually. By performing shift of image, resolution values were measured by using a resolution chart. The value of ½ inch in the commercially available ½ inch optical solid state imaging device represents an imaging range, namely about 6.4 mm in width and about 4.8 mm in height. The values of the imaging range slightly differs from manufacturer to manufacturer.

FIG. 9 is a sectional view showing the structure of an experimental model 300 incorporating an image shifting mechanism 400 on the basis of the measurement results shown in the graph of FIG. 8. The experimental model 300 comprises a lens portion 301, an image shifting mechanism mounting portion 302, a solid state imaging device mounting portion 303 and a circuit portion 304. In the experimental model 300, the lens portion 301, the image shifting mechanism mounting portion 302, the solid state imaging device mounting portion 303 are arranged in series in this order in parallel with the optical axis 15 from a light incoming hole (not shown) through which light enters so as to form an optical system. The circuit portion 304 comprises a signal-processing portion and an image composition processing portion for a solid state imaging device 401 (not shown), a circuit for controlling the image shifting mechanism 400, etc., and is disposed on the side where the optical system of the solid state imaging device mounting portion 303 is not disposed.

The lens portion 301 includes a ½ inch lens 307, VCL712BX made by Fujinon, and the ½ inch lens 307 is arranged so that the center of the ½ inch lens 307 is aligned with the optical axis 15.

The image shifting mechanism 400 is disposed so that the optical axis 15 passes through the refraction plate of the image shifting mechanism 400. Upper and lower bimorph type piezoelectric element supporting plates 308a and 308b formed as the fixed ends of the image shifting mechanism 400 are secured to an image shifting mechanism supporting plate 309 having the shape of a disc measuring a diameter of 60 mm and a thickness of 2 mm by using screws (not shown). The image shifting mechanism supporting plate 309 is secured to the surface of a supporting portion 330 disposed on the nearly circular image shifting mechanism mounting portion 302, on the light incoming hole side, by securing a plurality (two pieces in the figure) of securing portions 310a and 310b with screws. Therefore, image shifting mechanisms having different specifications can be used by removing the screws and by replacing the image shifting mechanism supporting plate 309.

The solid state imaging device 401 is disposed so that its center is aligned with the optical axis 15, and joined to a solid state imaging device supporting plate 311 so as to be supported. The solid state imaging device supporting plate 311 is secured with screws (not shown) to the surface of a securing portion 312 projected from the supporting portion 330 in the direction of the optical axis 15, on the side opposite to the light incoming hole. Therefore, solid state imaging devices 401 having different sizes in the range of ½ to ¼ inch can be used by removing the screws and by replacing the solid state imaging device supporting plate 311.

With this structure of the experimental model 300, the subject is imaged, a plurality of images obtained by image shifting are composed on the memory of the image composition processing portion, the composed image is output to a monitor or a printer to measure the resolution of the image in accordance with the condition of the experimental model 300, namely the conditions of the solid state imaging devices 401 for the optical systems in the range of ½ to ¼ inch. When image shifting is performed in this case, vibration occurred during the operation is transmitted from the image shifting mechanism 400 to the solid state imaging device 401. The arrows shown in the figure show vibration transmission paths. The vibration occurred in the image shifting mechanism 400 is transmitted from the image shifting mechanism supporting plate 309 to the supporting portion 330 via the securing portions 310a and 310b, and further transmitted from the securing portion 312 to the solid state imaging device supporting plate 311 and the solid state imaging device 401. Since the solid state imaging device itself on the image-receiving side is vibrated by the vibration, an effect is exerted on the resolution of the image having been taken and composed.

Figure 10A:
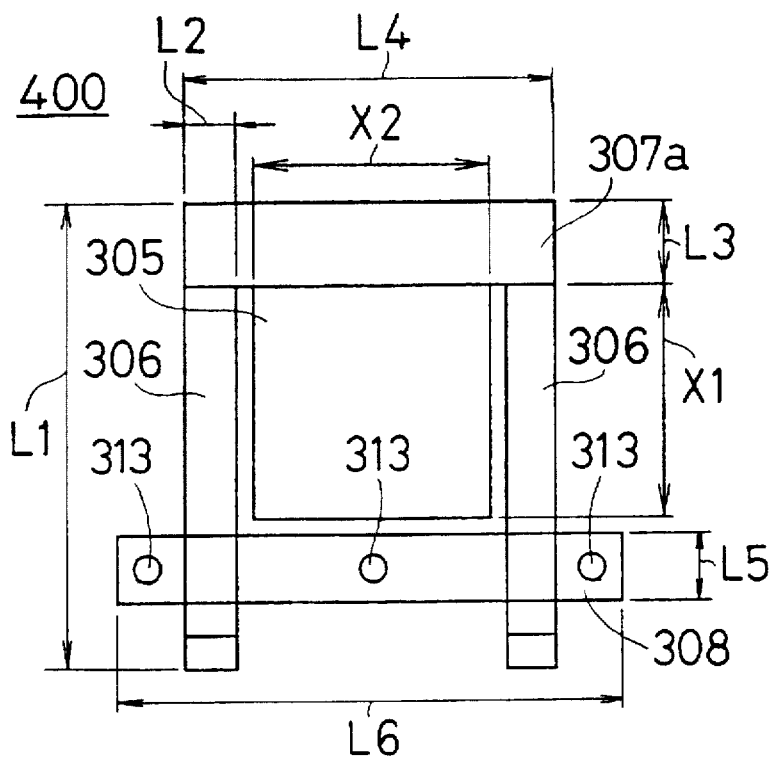
FIG. 10A is a plane view of the image shifting mechanism 400 of FIG. 9, taken from the upper side thereof
Figure 10B:
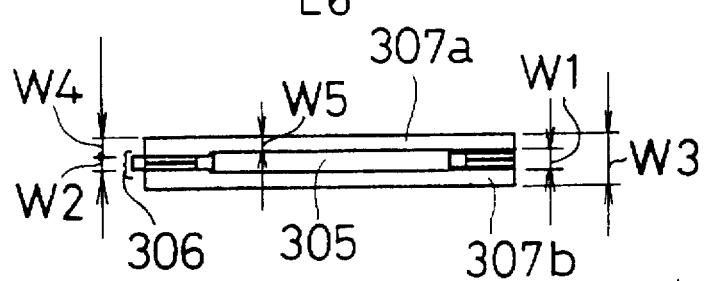
FIG. 10B is a side view of the image shifting mechanism 400 of FIG. 10A taken from the free end side thereof.
Figure 10C:
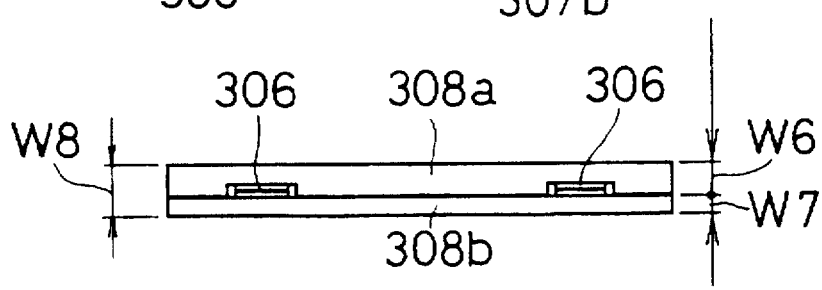
FIG. 10C is a side view of the image shifting mechanism 400 of FIG. 10A taken from the fixed end side thereof.
Figure 10D:
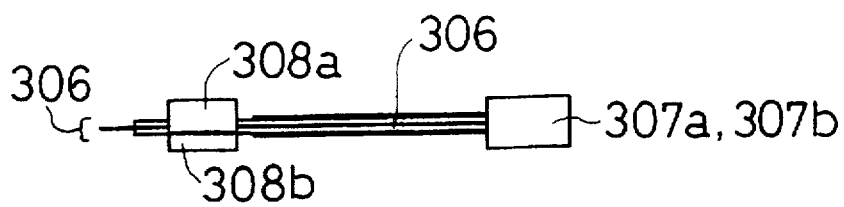
FIG. 10D is a side view of the image shifting mechanism 400 of FIG. 10A taken from the right side thereof.

FIGS. 10A, 10B, 10C and 10D show the detailed structure of the image shifting mechanism 400 shown in FIG. 9. FIG. 10A is a plan view taken from above the image shifting mechanism 400. FIG. 10B is a side view taken from the free end side of the image shifting mechanism 400 shown in FIG. 10A. FIG. 10C is a side view taken from the fixed end side of the image shifting mechanism 400 shown in FIG. 10A. FIG. 10D is a side view taken from the right side of the image shifting mechanism 400 shown in FIG. 10A. The image shifting mechanism 400 is adapted to be used with the ½ inch optical solid state imaging device, and Ic/Ig is set to 1.6. The dimensions of the image shifting mechanism 400 and the specifications of the components thereof are described below. However, the structure of the image shifting mechanism 400 is not described here since the structure is the same as that of the image shifting mechanism 10 shown in FIGS. 2 and 3.

A refraction plate 305 is mainly made of glass (BK7) and measures 19 mm in height (the unit of length is hereinafter given by mm and description of the unit is sometimes omitted), 14 in width and 1.2 in thickness (W1). Since the refraction plate 305 is sandwiched between upper and lower holding plates 307a and 307b, the range actually used by the image shifting mechanism 400 is 14 mm both in height X1 and width X2. Bimorph type piezoelectric elements 306 are mainly made of a material having a piezoelectric constant of about $300 \times 10^{-12}$ m/V and a specific gravity of 7.8, and measuring a height (L1) of 28, a width (L2) of 3 and a thickness (W2) of 0.8. The upper and lower holding plates 307a and 307b are made of HYPERSITE C1000 made by Yuka Electronics Co., Ltd. and measure a height (L3) of 5 and a width (L4) of 22. When the upper and lower holding plates 307a and 307b are seen sideways, they are nearly U-shaped. The thickness (W4) of the thick-walled portions at both ends is 1.1 and the thickness (W5) at the central portion is 0.9. The upper and lower supporting plates 308a and 308b of the bimorph type piezoelectric elements are made of HYPERSITE C1000 made by YUKA ELECTRONICS CO., LTD. and measures a height (L5) of 4 and a width (L6) of 30. The thickness (W6) of the upper bimorph type piezoelectric element supporting plate 308a is 2 and the thickness (W7) of the lower bimorph type piezoelectric element supporting plate 308b is 1. Since the upper and lower bimorph type piezoelectric element supporting plates 308a and 308b are used as the fixed end of the image shifting mechanism 400, three screw holes 313 used for securing the image shifting mechanism supporting plate 309 are provided at both ends and the central portion of the supporting plates 308a and 308b.

The image shifting mechanism 400 comprising the above-mentioned components measures a height (L1) of 28, a width (L6) of 30, a thickness (W8) of 3 on the fixed end side and a thickness (W3) of 3 on the free end side.

Furthermore, the value of Ic/Ig of the image shifting mechanism 400 can be changed as desired by adjusting the length or other dimensions of the bimorph type piezoelectric element 306. The size of the refraction plate 305 is changed linearly depending on the size of the solid-state imaging device 401 mounted on the solid state imaging device supporting plate 311 of the experimental model 300. In accordance with this change, the sizes of the bimorph type piezoelectric element 306 and other components are also changed.

A resolution chart (Type A-1), made by Murakami Color Technology Laboratory Ltd., for evaluating the resolutions of commercially available TV cameras were used to measure resolution. This resolution chart is provided with a plurality of parallel lines arranged vertically at different intervals, for example; the intervals are made smaller in the up-to-down direction and a resolution value corresponding to each line is assigned. To measure the resolution, this resolution chart is imaged by the above-mentioned experimental model 300, a plurality of images obtained by image shifting are composed, and the composed image of the resolution chart is reproduced by a monitor and the image is observed by a person in charge of measurement. The person observes the image comprising a plurality of parallel lines and having been reproduced by the monitor. The resolution value assigned for the two parallel lines, just ahead of the two parallel lines, the interval of which becomes unrecognizable, is used as the result of measurement.

As shown in FIG. 8, the resolution is hardly affected until the value of Ic/Ig is not more than 1.6. When the value of Ic/Ig begins to exceed 1.6, the resolution is deteriorated significantly.

This can be explained as follows. Since the mass of the optical system itself is large, the magnitude of vibration is minute until the value of Ic/Ig is not more than 1.6, even when the refraction plate is driven. Therefore, the swing of the optical axis is small, thereby causing less effect on the resolution.

Furthermore, the obtained results are not closely related to the size of the optical system because of the following reason. Even when the same value of Ic/Ig is used, as the size of the optical system increases, the thrust force for driving the refraction plate becomes larger. In proportion to this, the mass of the optical system also increases, thereby making the magnitude of the vibration constant. Accordingly, although it is ideal that the rotation center O is aligned with the center of gravity g, the specifications, such as the thickness, length and width values of the major components of the actuator, such as the refraction plate and the bimorph type piezoelectric elements, should be designed so that at least the above-mentioned value of Ic/Ig is 1.6 or less.

Figure 11:
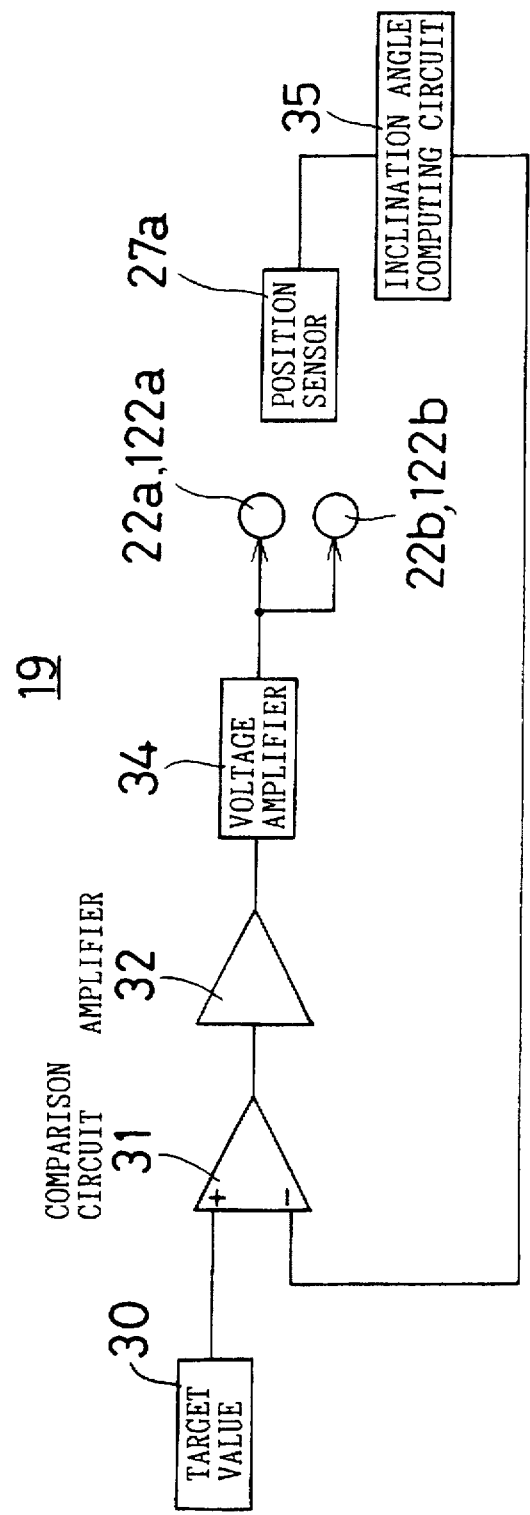
FIG. 11 is a block diagram showing the control configuration of a drive circuit 19 of an imaging apparatus of an embodiment.

FIG. 11 shows the configuration of the control system for the drive circuit 19 of the image shifting mechanisms 10, 100. The target value 30 of the inclination angle of the refraction plates 21, 121 of the image shifting-mechanisms 10, 100 is an inclination angle of the refraction plates 21, 121 required for image shifting and offered from such a control portion as that included in the image-processing circuit 20 shown in FIG. 1. A comparison circuit 31 compares the target value 30 with the inclination angle of the image shifting refraction plates 21, 121 corresponding to the positions of the bimorph type piezoelectric elements 22a and 22b; 122a and 122b detected by the position sensor 27a and outputs a difference signal. The difference signal is supplied to an amplifier circuit 32. The amplifier circuit 32 comprises a servo-control gain adjuster, a notch filter for preventing the resonance of the moving portions of the image shifting mechanisms 10, 100, a low-pass filter (hereinafter referred to as LPF) for cutting bands other than the servo-control band, etc. The amplifier circuit 32 outputs a signal processed on the basis of the difference signal to a voltage amplifier 34. The voltage amplifier 34 generates a predetermined voltage value to drive the bimorph type piezoelectric elements 22a and 22b; 122a and 122b via the lead wires 26a and 26b.

On the basis of the displacements of the bimorph type piezoelectric elements 22a and 22b; 122a and 122b detected by the position sensor 27a and an inclination angle computing circuit 35 obtains the inclination angle of the refraction plates 21, 121 by computing, and outputs the angle value to the comparison circuit 31. Instead of the output from the position sensor 27a, the output from the position sensor 27b, or the average of the output values from the position sensors 27a and 27b can also be used.

Figure 12:
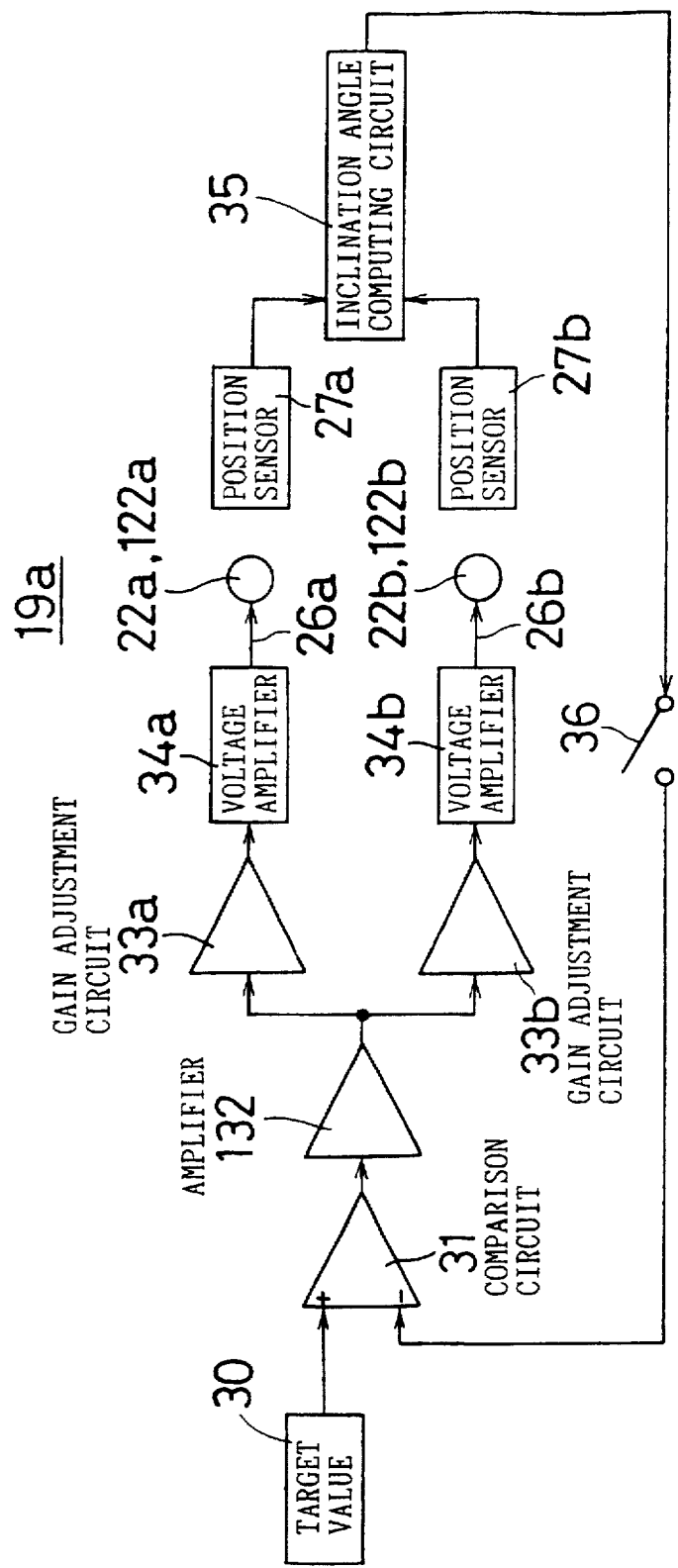
FIG. 12 is a block diagram showing the control configuration of a drive circuit 19a of an imaging apparatus of another embodiment.

FIG. 12 shows the configuration of the control system for another drive circuit 19a of the image shifting mechanisms 10, 100. Since the configuration of the drive circuit 19a is similar to that of the drive circuit 19 shown in FIG. 11, the same reference codes are assigned to designate the same components, and such components are not explained here. The target value 30 of the inclination angle of the refraction plates 21, 121 of the image shifting mechanisms 10, 100 is an inclination angle required for image shifting and offered from such a control portion as that included in the image-processing circuit 20 shown in FIG. 1. A comparison circuit 31 compares the target value 30 with the inclination angle of the refraction plates 21, 121 corresponding to the positions of the bimorph type piezoelectric elements 22a and 22b or the bimorph type piezoelectric elements 122a and 122b detected by the position sensors 27a and 27b, and outputs a difference signal. An amplifier 132 comprises a notch circuit for preventing the resonance of the moving portions of the image shifting mechanism, an LPF for cutting bands other than the servo-control band, etc. The output of the amplifier 32 is supplied to gain adjustment circuits 33a and 33b respectively provided for the bimorph type piezoelectric elements 22a and 22b and the bimorph type piezoelectric elements 122a and 122b. The gain adjustment circuits 33a and 33b adjust the gains depending on the individual differences in the piezoelectric constants of the bimorph type piezoelectric elements 22a and 22b or bimorph type piezoelectric elements 122a and 122b to correct the differences in the properties and characteristics of the bimorph type piezoelectric elements 22a and 22b or bimorph type piezoelectric elements 122a and 122b. Voltage amplifier circuits 34a and 34b generate predetermined voltage values depending on the input signals so as to drive the bimorph type piezoelectric elements 22a and 22b or the bimorph type piezoelectric elements 122a and 122b via the lead wires 26a and 26b respectively. The inclination angle of the refraction plate 21 is obtained by an inclination angle computing circuit 35 on the basis of the displacements detected by the position sensors 27a and 27b caused by the displacements of the bimorph type piezoelectric elements 22a and 22b or the bimorph type piezoelectric elements 122a and 122b. The output from the inclination angle computing circuit 35 is inputted to the above-mentioned comparison circuit 31 via a selection switch 36 and compared with the target value 30 of the inclination angle of the refraction plate 21 or 121. The selection switch 36 is turned on during normal operation and turned off during correction operation described later.

During the normal operation wherein the selection switch 36 is turned on, the above-mentioned servo-control loop is formed, and the refraction plate 21 or 121 is inclined depending on the signal of the target value 30. However, since the bimorph type piezoelectric elements 22a and 22b or the bimorph type piezoelectric elements 122a and 122b generally have individual differences, even when the pair of bimorph type piezoelectric elements 22a and 22b; 122a and 122b are disposed on both sides of the refraction plate 21 just as in the case of the present embodiment, the actual displacements of the bimorph type piezoelectric elements 22a and 22b; 122a and 122b are different many times, although the same target value has been set. Therefore, in case the bimorph type piezoelectric elements 22a and 22b; 122a and 122b having such differences in properties and characteristics are used, even when an attempt is made to incline the refraction plate 21 around the x axis as shown in FIG. 2, the refraction plate 21 is additionally inclined around the y axis, whereby the image shifting mechanism cannot function accurately.

As a correction action for solving this problem, the selection switch 36 is turned off so as to break the servo-control loop. Next, the predetermined target value 30 is supplied from a control portion (not shown) so that a change takes place at a drive speed to be used actually. The outputs of the position sensors 27a and 27b are monitored by an oscilloscope or the like. The gain adjustment circuits 33a and 33b are adjusted so that the signal outputs of the position sensors 27a and 27b being monitored have the same amplitude value. By the above-mentioned correction, the amounts of deformations of the pair of bimorph type piezoelectric elements 22a and 22b; 122a and 122b disposed on both sides of the refraction plates 21, 121 with respect to the target value 30 can be unified, and the refraction plates 21, 121 can be prevented from inclining in improper directions. Consequently, the deformations of the bimorph type piezoelectric elements 22a and 22b; 122a and 122b are not affected by the individual differences in their deformation characteristics, and the directions of the rotation axes of the refraction plate 21, 121 can be determined accurately. It is not always necessary to install the two gain adjustment circuits 33a and 33b, but at least one of them may be used.

Figure 13:
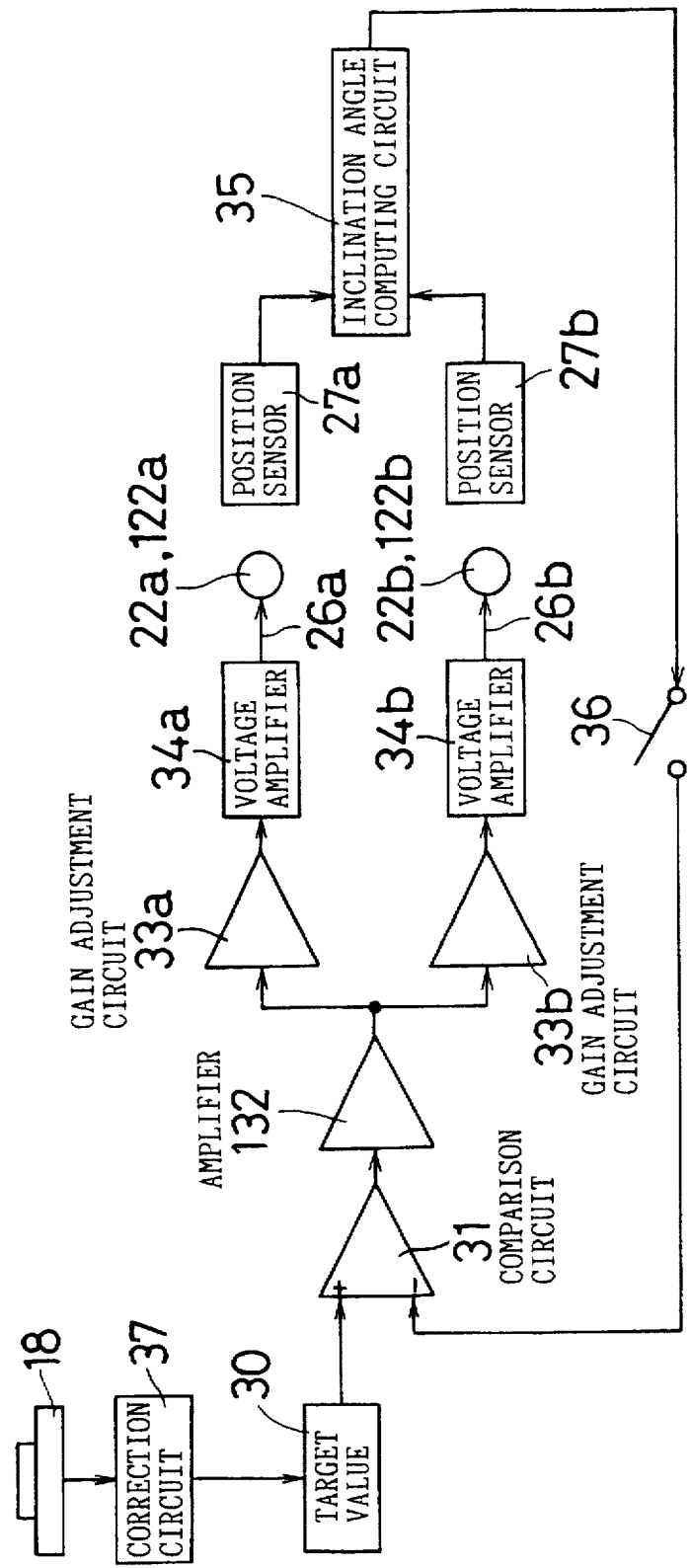
FIG. 13 is a block diagram showing the control configuration of an imaging apparatus of still another embodiment of the invention.

FIG. 13 shows the configuration of a control system in accordance with still another embodiment of the invention. The configuration of this embodiment is similar to that shown in FIG. 12. The components corresponding to those shown in FIG. 12 are designated by the same reference codes, and the explanation of the components is omitted. The output from the solid state imaging device 18 is supplied to the image-processing circuit 20 and undergoes predetermined image processing just as shown in FIG. 1 to obtain an image with higher resolution. The output from the solid state imaging device 18 is also supplied to a correction circuit 37 and corrected so as to accurately secure the image shifting amount of the image shifting mechanisms 10, 100 at all times. The output from the correction circuit 37 is used as the target value 30. The subsequent operations are the same as those described referring to FIG. 12.

Figure 14:
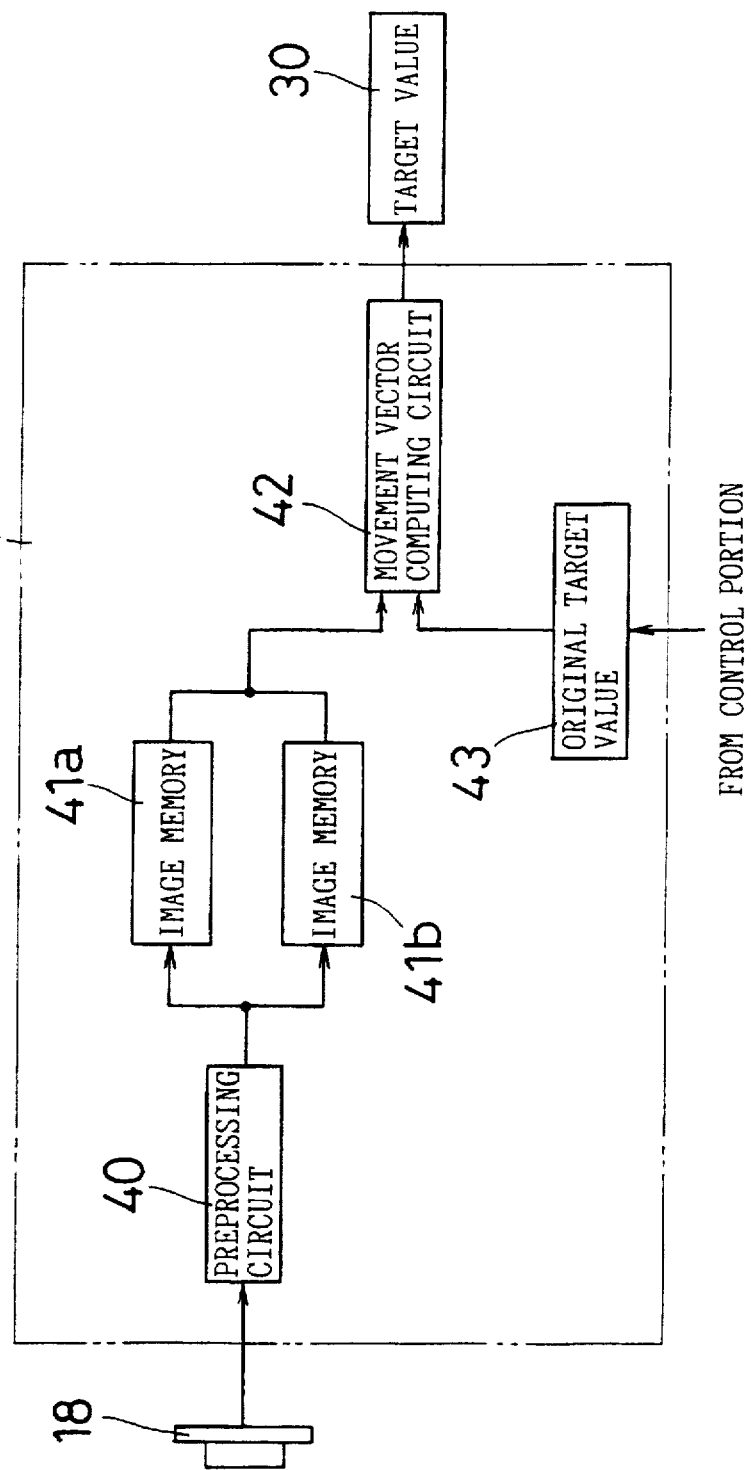
FIG. 14 is a block diagram showing the electrical configuration of a correction circuit 37 shown in FIG. 7.

FIG. 14 shows the detailed electrical configuration of the target value correction circuit 37 shown in FIG. 13. The signal from the solid state imaging device 18 is supplied to a preprocessing circuit 40 for analog/digital conversion, gamma correction, etc. The output processed by the preprocessing circuit 40 is stored by an image memory 41a for storing image data before image shifting and by an image memory 41b for storing image data after image shifting. A movement vector computing circuit 42 computes a movement vector between the image data before image shifting and the image data after image shifting, which are stored by the image memory 41a and 41b, and compares the vector with a movement vector assumed from an original target value 43 supplied from an external control portion. If there is a difference between the two, a newly corrected target value 30 is obtained from the difference. The representative point matching method, the optical flow method or the like is generally used as a movement computing method, and such a method can also be used for the configuration of the present embodiment.

Since the target value 30 is always corrected on the basis of the image data as described above, image shifting can be performed accurately. In addition, no change occurs with time as a matter of course because of the same reason, and the image shifting mechanisms 10, 100 can perform stable operation for an extended period of time. Although the above-mentioned correction can be performed each time an imaging apparatus is used, for example, as an initial operation, the correction can also be performed at predetermined intervals or at any given time by manual operation, provided that the change with time is small.

Figure 15:
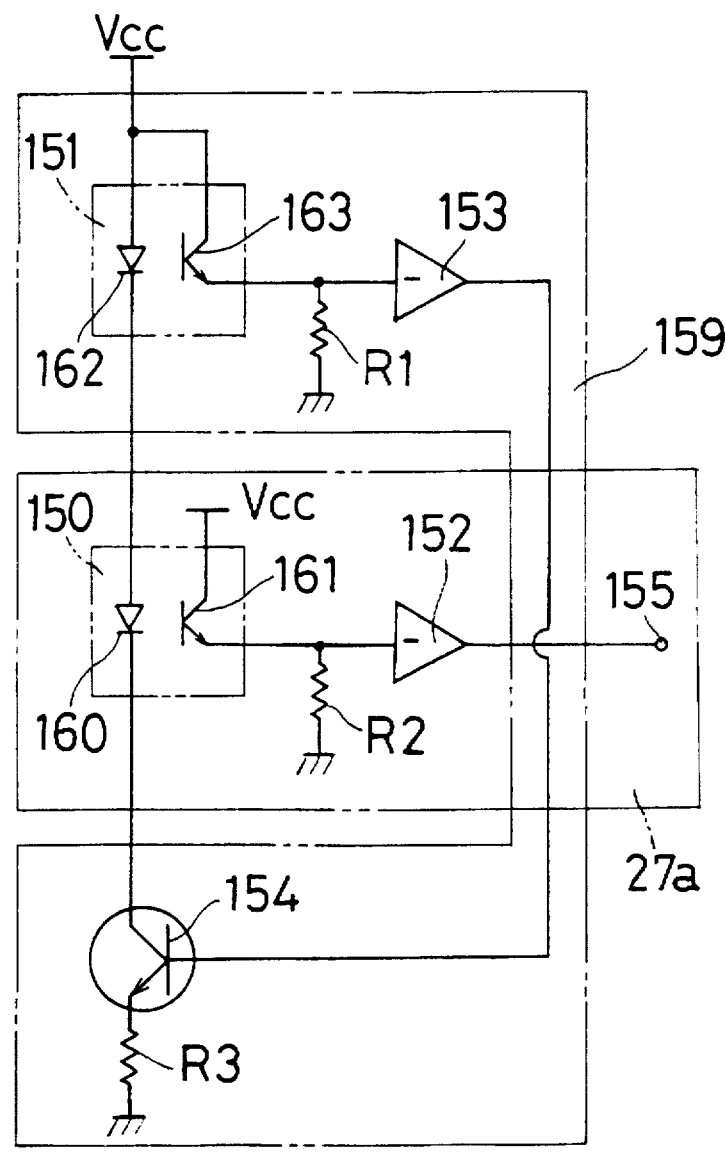
FIG. 15 shows the electrical configuration of position sensors 27a and 27b used as means for detection in the control system of an imaging apparatus.
Figure 16:
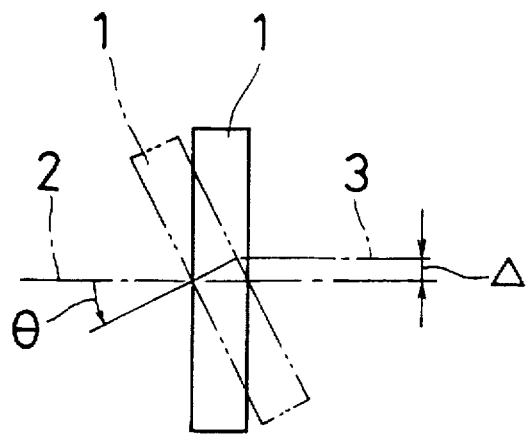
FIG. 16 is a schematic side view showing an image shifting principle.
Figure 17:
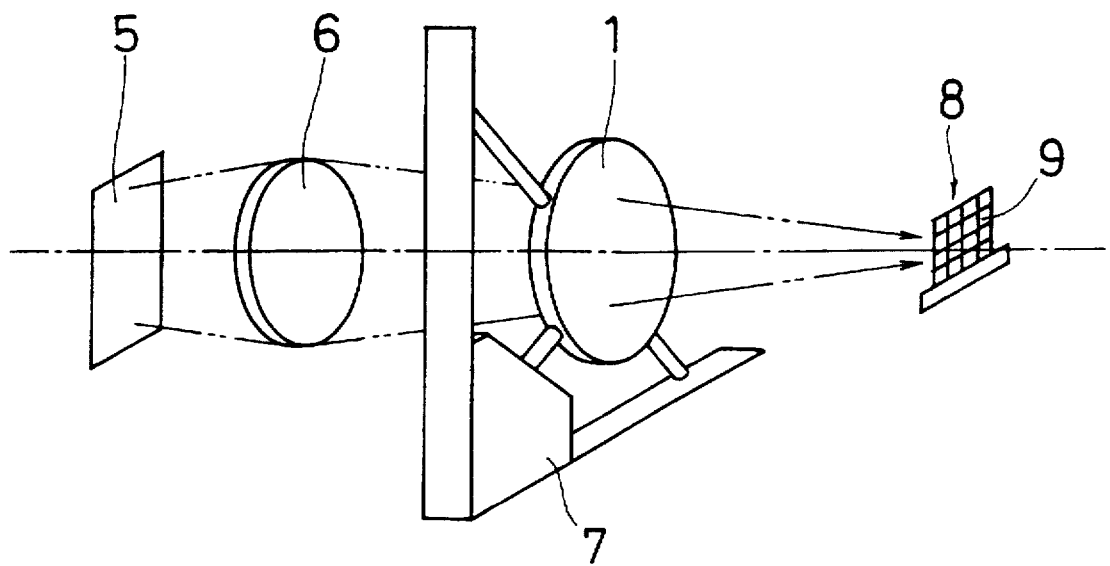
FIG. 17 is a perspective view showing the structure of an image shifting mechanism of a prior art.

FIG. 15 is a circuit diagram showing the electrical configuration of means for detection in the control system of an imaging apparatus. The position sensor 27a of the detection means is explained here. However, the position sensor 27b is not explained since it is the same as the position sensor 27a in structure. The detection means comprises the position sensor 27a and a compensation circuit 159. The position sensor 27a comprises a photo interrupter 150, an amplifier circuit 152 and a resistor R2 and an output terminal 155. The compensation circuit 159 comprises a photo interrupter 151, an npn transistor 154 and resistors R1, R3.

The photo interrupters 150, 151 comprise light-emitting diodes (hereafter referred to as LEDs) 160, 162, photo transistors 161, 163 respectively. When current flows through the LED 160 in the position sensor 27a, the LED 160 emits visible or infrared light. The light is reflected by the reflection plates 160a and 160b or the like provided in the bimorph type piezoelectric elements 22a and 22b or the bimorph type piezoelectric elements 122a and 122b, and fed to the photo transistor 161. By the light, conduction takes place between the collector and emitter of the photo transistor 161, and the photo transistor 161a outputs a signal corresponding to the amount of the light. The outputted signal is supplied to the inverting input terminal to which the resistor R2 is connected, and inverted and amplified by the amplifier circuit 152, and then outputted from the output terminal 155. Consequently, the displacement of the bimorph type piezoelectric elements 22a and 22b or the bimorph type piezoelectric elements 122a and 122b can be detected.

The output value of the photo interrupter may change depending on the change in external temperature. The photo interrupter 151 is provided to prevent the output value of the photo interrupter 150 from being affected by the change in temperature. The photo interrupter 151 has the same characteristic as that of the photo interrupter 150, disposed at a position unaffected by the moving portions of the image shifting mechanism in the imaging apparatus, and does not detect the positions of the reflection plate, refraction plate, etc. That is to say, the photo interrupter 151 is provided as a temperature compensation circuit so that the photo interrupter 150 can output normal output values.

The LED 162 of the photo interrupter 151 is connected in series with the LED 160 of the photo interrupter 150, and further connected in series with the collector of the transistor 154. The emitter terminal of the transistor 154 is connected to the ground potential via the resistor R3. The output of the photo transistor 163 of the photo interrupter 151 is supplied to the inverting input terminal of the amplifier circuit 153, to which the resistor R1 is connected, and inverted and amplified by the amplifier circuit 153, and then supplied to the base terminal of the transistor 154. Since the output of the photo transistor 163 is inverted and amplified by the amplifier circuit 153, when the output of the photo transistor 163 increases, the signal supplied to the base terminal of the transistor 154 becomes smaller, and the current flowing between the collector and emitter of the transistor 163 decreases. In contrast, when the output of the photo transistor 163 decreases, the signal supplied to the base terminal of the transistor 154 becomes larger, and the current flowing between the collector and emitter of the transistor 163 increases.

For this reason, when the output of the photo transistor 163 increases because of the change in temperature, the output of the photo interrupter 151 increases, and an inverted and amplified output signal is supplied to the transistor 154. Therefore, the current flowing between the collector and emitter of the transistor 154 decreases, and the currents flowing the LEDs 160, 162 are also decreased accordingly. Consequently, the amounts of light emitted from the LEDs 160, 162 decrease, and the output of the photo interrupter 150 also decreases.

On the other hand, when the output of the photo transistor 163 decreases, the output of the photo interrupter 150 also decreases, and an inverted and amplified output signal is supplied to the transistor 154. Therefore, the current flowing between the collector and emitter of the transistor 154 increases, and the currents flowing the LEDs 160, 162 increase accordingly. Consequently, the amounts of light emitted from the LEDs 160, 162 increase, and the output of the photo interrupter 150 also increases.

As a result, the change in the output signal of the photo interrupter 150 due to the temperature change in the imaging apparatus can be reduced, and a detection signal having a proper level can be outputted. Therefore, the positions of the bimorph type piezoelectric elements can be detected accurately, and the configuration having minimal deterioration in resolution can be attained even when temperature change is caused by the change in environments outside the apparatus. Although photo interrupters are used for the compensation circuit in the present embodiment to perform temperature compensation of the position sensor 27a or 27b, a temperature detection element, such as a thermistor, can also be used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image shifting mechanism for shifting the optical axis of incident light to a solid state imaging device by inclining a flat refraction plate and equivalently increasing the resolution of an image, the image shifting mechanism being disposed between an optical system for condensing light from a subject and a solid state imaging device for imaging the subject, wherein a pair of bimorph type piezoelectric elements are disposed on both sides of the flat refraction plate so that the surfaces of the elements are nearly parallel to a surface of the flat refraction plate, one end of the flat refraction plate is joined to the free end sides of the pair of bimorph type piezoelectric elements to be supported such that the other end of the flat refraction plate extends toward the fixed end sides of the pair of bimorph type piezoelectric elements, and the flat refraction plate is angularly displaceable about an imaginary rotation center in the flat refraction plate owing to the displacement of the pair of bimorph type piezoelectric elements.

2. The image shifting mechanism of claim 1, wherein specifications of the flat refraction plate and the bimorph type elements are determined so that the rotation center used as the inclination center of the flat refraction plate passes through the center of gravity of the image shifting mechanism.

3. The image shifting mechanism of claim 1, wherein specifications of the flat refraction plate and the bimorph type piezoelectric elements are determined so that a formula of $$Ic/Ig \leq 1.6$$

can be established between the moment of inertia Ic around the rotation center used as the inclination center of the flat refraction plate and the moment of inertia Ig around the center of gravity of the moving portions of the image shifting mechanism.

4. The image shifting mechanism of any one of claims 1 to 3, wherein the free ends of the pair of bimorph type piezoelectric elements and the one end of the flat refraction plate are sandwiched between a pair of holding plates from the sides of the top and bottom surfaces of the flat refraction plate.

5. The image shifting mechanism of any one of claims 1 to 3, wherein
   the pair of bimorph type piezoelectric elements is formed at a pair of parallel portions of a nearly U-shaped intermediate electrode, respectively, and
   the flat refraction plate is joined to the connection portion of the intermediate electrode, connecting the pair of parallel portions of the intermediate electrode.

6. An imaging apparatus comprising:
   an image shifting mechanism for shifting the optical axis of incident light to a solid state imaging device by inclining a flat refraction plate and equivalently increasing the resolution of an image, the image shifting mechanism being disposed between an optical system for condensing light from a subject and a solid state imaging device for imaging the subject, wherein
   a pair of bimorph type piezoelectric elements is disposed on both sides of the flat refraction plate so that the surfaces of the elements are nearly parallel to a surface of the flat refraction plate,
   one end of the flat refraction plate is joined to the free end sides of the pair of bimorph type piezoelectric elements to be supported such that the other end of the flat refraction plate extends toward the fixed end sides of the pair of bimorph type piezoelectric elements, and
   the flat refraction plate is angularly displaceable about an imaginary rotation center in the flat refraction plate owing to the displacement of the pair of bimorph type piezoelectric elements,
   the imaging apparatus further comprising:
   drive means for driving the pair of bimorph type piezoelectric elements,
   detection means for detecting the inclination angle of the refraction plate,
   comparison means for comparing an output of the detection means with a predetermined target value and for outputting the quantitative error between the output and the target value, and
   control means for controlling an output of the drive means in response to the output of the comparison means,
   wherein the pair of bimorph type piezoelectric elements are driven so that the inclination angle of the refraction plate coincides with the predetermined target value.

7. The imaging apparatus of claim 6, wherein the inclination angle of the flat refraction plate is detected by detecting displacement amounts of the pair of bimorph type piezoelectric elements.

8. An imaging apparatus comprising:
   an image shifting mechanism for shifting the optical axis of incident light to a solid state imaging device by inclining a flat refraction plate and equivalently increasing the resolution of an image, the image shifting mechanism being disposed between an optical system for condensing light from a subject and a solid state imaging device for imaging the subject, wherein
   a pair of bimorph type piezoelectric elements is disposed on both sides of the flat refraction plate so that the surfaces of the elements are nearly parallel to a surface of the flat refraction plate,
   one end of the flat refraction plate is joined to the free end sides of the pair of bimorph type piezoelectric elements to be supported such that the other end of the flat refraction plate extends toward the fixed end sides of the pair of bimorph type piezoelectric elements, and
   the flat refraction plate is angularly displaceable about an imaginary rotation center in the flat refraction plate owing to the displacement of the pair of bimorph type piezoelectric elements,
   the imaging apparatus further comprising:
   a pair of drive means for driving the pair of bimorph type piezoelectric elements respectively, and
   gain adjustment means added to at least one of the pair of drive means,
   wherein an inclination direction of the flat refraction plate can be adjusted by controlling the gain adjustment means and correcting individual differences of the bimorph type piezoelectric elements.

9. The imaging apparatus of claim 8, further comprising:
   detection means for detecting the inclination angle of the flat refraction plate,
   comparison means for comparing an output of the detection means with a predetermined target value and outputting the quantitative error between the output and the target value, and control means for controlling the pair of the drive means in response to the output of the comparison means, wherein the pair of bimorph type piezoelectric elements are driven so that the inclination angle of the flat refraction plate coincides with the predetermined target value.

10. The imaging apparatus of claim 9, wherein the inclination angle of the flat refraction plate is detected by detecting displacement amounts of the pair of bimorph type piezoelectric elements.

11. The imaging apparatus of any one of claims 6 to 10, further comprising an image processing circuit which compares image data obtained at the inclination angle of the flat refraction plate before image shifting with image data obtained at the inclination angle of the flat refraction plate after image shifting, computes the movement vector of the image having been moved during image shifting, and corrects the inclination angle of the flat refraction plate on the basis of the computed results.

12. The imaging apparatus of claim 6 or 7, further comprising correction means including a temperature detection element, for correcting an output value of the detection means in response to detection results of the temperature detection element.

13. The imaging apparatus of claim 12, wherein the temperature detection element is second detection means having the same detection characteristic of the detection means, and is disposed at a position not affected by the displacements of the moving portions of the image shifting mechanism.

* * * * *